United States Patent
Lee et al.

(10) Patent No.: US 12,374,995 B2
(45) Date of Patent: Jul. 29, 2025

(54) CHARGING INTEGRATED CIRCUIT INCLUDING BIDIRECTIONAL SWITCHING CONVERTER, AND ELECTRONIC DEVICE INCLUDING THE SAME

(71) Applicant: SAMSUNG ELECTRONICS CO., LTD., Suwon-si (KR)

(72) Inventors: Sungwoo Lee, Hwaseong-si (KR); Hyebong Ko, Yongin-si (KR); Hyoungseok Oh, Seoul (KR); Kyeseok Yoon, Suwon-si (KR); Daewoong Cho, Yongin-si (KR); Woonhyung Heo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 18/153,003

(22) Filed: Jan. 11, 2023

(65) Prior Publication Data

US 2023/0231479 A1    Jul. 20, 2023

(30) Foreign Application Priority Data

Jan. 14, 2022   (KR) .................. 10-2022-0006177

(51) Int. Cl.
*H02M 3/158*   (2006.01)
*H02M 1/00*    (2006.01)
*H02M 1/08*    (2006.01)

(52) U.S. Cl.
CPC ....... *H02M 3/1582* (2013.01); *H02M 1/0009* (2021.05); *H02M 1/083* (2013.01)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 8,436,591 B2    5/2013   Dearn
8,853,888 B2 *  10/2014  Khaligh .............. H02M 3/1582
                                                       307/82
(Continued)

FOREIGN PATENT DOCUMENTS

KR    10-2015-0141428    12/2015
KR    10-2016-0012505    2/2016
(Continued)

OTHER PUBLICATIONS

ISL81601: 60V Bidirectional 4-Switch Syncrhonous Buck-Boost Controller; Renesas Datasheet, Rev.3.00, Nov. 21, 2018.

*Primary Examiner* — Jeffrey A Gblende
(74) *Attorney, Agent, or Firm* — Morgan , Lewis & Bockius LLP

(57) ABSTRACT

A charging integrated circuit (IC) includes a bidirectional switching converter and a controller. The bidirectional switching converter is configured to generate a first output voltage by bucking a first input voltage based on a first switching operation in a buck mode, generate a second output voltage by boosting a second input voltage based on a second switching operation in a boost mode, and generate the first output voltage or the second output voltage based on a third switching operation in a buck-boost mode. The controller is configured to control the second switching operation according to a valley current mode control (VCMC) in a continuous current section and control the (Continued)

second switching operation according to a voltage mode control (VMC) based on a fixed switching frequency in a discontinuous current section, in the boost mode.

19 Claims, 18 Drawing Sheets

(58) Field of Classification Search
CPC ............... H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02J 3/46; H02J 3/38

See application file for complete search history.

(56) References Cited

U.S. PATENT DOCUMENTS

| | | | |
|---|---|---|---|
| 8,878,389 B2* | 11/2014 | Dighrasker | H02M 3/1582 |
| | | | 307/66 |
| 9,575,502 B2 | 2/2017 | Song et al. | |
| 9,705,401 B2 | 7/2017 | Cho et al. | |
| 9,859,796 B2 | 1/2018 | Yoon et al. | |
| 10,355,596 B2 | 7/2019 | Choquet | |
| 10,566,902 B1 | 2/2020 | Romeo | |
| 10,644,600 B2 | 5/2020 | Wu et al. | |
| 10,804,801 B2* | 10/2020 | Houston | H02M 3/1582 |
| 11,527,957 B2* | 12/2022 | Karri | H02M 3/1582 |
| 11,563,378 B2* | 1/2023 | Becker | H02M 1/14 |
| 2011/0227550 A1 | 9/2011 | Walters et al. | |
| 2022/0123654 A1 | 4/2022 | Park | |
| 2022/0231518 A1* | 7/2022 | Kun | H02M 1/0054 |
| 2023/0318457 A1* | 10/2023 | Terrace | H02M 3/158 |
| | | | 323/271 |
| 2023/0344345 A1* | 10/2023 | Oner | H02M 3/1588 |

FOREIGN PATENT DOCUMENTS

| | | |
|---|---|---|
| KR | 10-2018-0114373 | 10/2018 |
| KR | 10-2193987 | 12/2020 |
| KR | 10-2199760 | 12/2020 |

* cited by examiner

CHARGING INTEGRATED CIRCUIT INCLUDING BIDIRECTIONAL SWITCHING CONVERTER, AND ELECTRONIC DEVICE INCLUDING THE SAME

CROSS-REFERENCE TO RELATED APPLICATIONS

This U.S. non-provisional patent application claims priority under 35 U.S.C. § 119 to Korean Patent Application No. 10-2022-0006177, filed on Jan. 14, 2022, in the Korean Intellectual Property Office, the disclosure of which is incorporated by reference in its entirety herein.

1. TECHNICAL FIELD

The inventive concept relates to a charging integrated circuit (IC) including a bidirectional switching converter, and an electronic device including the charging IC.

2. DISCUSSION OF RELATED ART

A mobile electronic device uses a chargeable battery as a power supply. Due to the limited capacity of the battery, a user has to charge the battery before the remaining capacity of the battery is entirely exhausted. A charger may convert power supplied from alternating current (AC) or from another power supply (e.g., a computer) into direct current (DC) power for charging the battery. Examples of the charger include a wired charger and a wireless charger.

Some mobile devices, such as smartphones and tablet personal computers (PCs) support both wired charging and wireless charging. Accordingly, a mobile device may include a charging circuit capable of switching modes to stably support a wireless operation and a wired operation even when an input power source is unstable. However, an over-current may occur in the charging circuit.

SUMMARY

At least one embodiment of the inventive concept provides a bidirectional switching converter, which supports a plurality of switching modes and provides seamless transition among the plurality of switching modes, a charging integrated circuit (IC) including the bidirectional switching converter, and an electronic device including the charging IC.

According to an embodiment of the inventive concept, a charging integrated circuit includes a bidirectional switching converter and a controller. The bidirectional switching converter is configured to generate a first output voltage by bucking a first input voltage based on a first switching operation in a buck mode, generate a second output voltage by boosting a second input voltage based on a second switching operation in a boost mode, and generate the first output voltage or the second output voltage based on a third switching operation in a buck-boost mode. The controller is configured to control the second switching operation according to a valley current mode control in a continuous current section and control the second switching operation according to voltage mode control based on a fixed switching frequency in a discontinuous current section, in the boost mode.

According to an embodiment of the inventive concept, an electronic device includes a battery, a charging integrated circuit, a first power interface, and a second power interface. The charging integrated circuit is configured to charge the battery by bucking a first voltage input through a first node in a buck mode, output first power through the first node by boosting a second voltage charged in the battery in a boost mode, charge the battery or output the first power in a buck-boost mode, and operate based on a switching signal having a fixed frequency according to voltage mode control in a discontinuous current section in the boost mode. The first power interface is configured to provide the first voltage to the charging integrated circuit. The second power interface is configured to receive the first power.

According to an embodiment of the inventive concept, a charging integrated circuit includes a controller. The bidirectional switching converter is configured to charge a battery by forming a first power path in a first direction based on a first switching operation, in a buck mode, provide power to an external device based on a voltage charged in the battery by forming a second power path in a second direction that is different from the first direction, based on a second switching operation, in a boost mode, and charge the battery or provide the power to the external device based on a third switching operation, in a buck-boost mode. The controller is configured to generate an error voltage indicating a difference between a voltage level of the output voltage and a target voltage level based on an output voltage of the bidirectional switching converter, and control the first switching operation in the buck mode, the second switching operation in the boost mode, and the third switching operation in the buck-boost mode, based on the error voltage.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
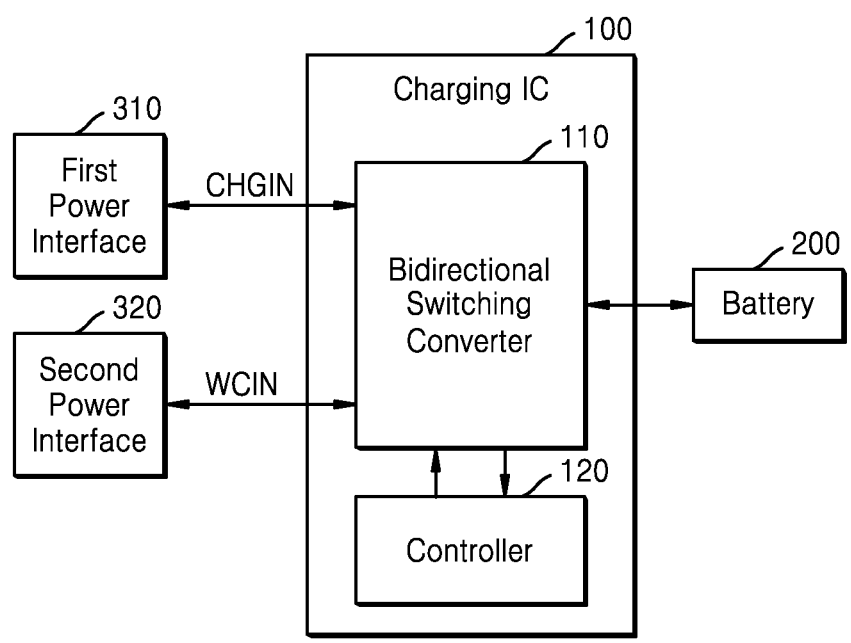
FIG. 1 is a block diagram schematically showing an electronic device including a charging integrated circuit (IC), according to an example embodiment of the inventive concept.

FIG. 1 is a block diagram schematically showing an electronic device including a charging integrated circuit (IC), according to an example embodiment of the inventive concept.

Referring to FIG. 1, an electronic device 10 includes a charging IC 100 and a battery 200. The electronic device 10 may further include a main processor and peripheral devices. For example, the electronic device 10 may be a mobile device, such as a smartphone, a tablet personal computer (PC), a cellular phone, a personal digital assistant (PDA), a laptop, a wearable device, a global positioning system (GPS) device, an electronic book terminal, a digital broadcasting terminal, an MP3 player, a digital camera, etc. For example, the electronic device 10 may be an electric vehicle.

The battery 200 may be embedded in the electronic device 10. In an embodiment, the battery 200 is configured to be removable from the electronic device 10. The battery 200 may include one battery cell or a plurality of battery cells. The plurality of battery cells may be connected in series or in parallel. When an external charging device is not connected to the electronic device 10, the battery 200 may supply power to the electronic device 10.

The charging IC 100 may charge the battery 200 and may be referred to as a "battery charger". Moreover, the charging IC 100 may supply power to an external device connected to the charging IC 100 (e.g., a wired interface or a wireless interface), based on a voltage charged in the battery 200. For example, the charging IC 100 may be implemented with one or more IC chips and mounted on a printed circuit board (PCB).

The charging IC 100 includes a bidirectional switching converter 110 and a controller 120 (e.g., a control circuit). The bidirectional switching converter 110 may be implemented as a direct current (DC)-DC converter, and buck or boost an input voltage to generate an output voltage. For example, the buck of the input voltage may reduce a level of the input voltage and the boost of the input voltage may increase a level of the input voltage. When the bidirectional switching converter 110 bucks the input voltage, i.e., performs a buck converting operation, a first power path in a first direction is formed, and when the bidirectional switching converter 110 boosts the input voltage, i.e., performs a boost converting operation, a second power path in a second direction that is opposite to the first direction may be formed. Hereinbelow, in the inventive concept, the first direction is referred to as a forward direction, and the second direction is referred to as a reverse direction. Therefore, the buck converting operation of the bidirectional switching converter 110 is referred to as a forward buck converting operation and the boost converting operation of the bidirectional switching converter 110 is referred to as a reverse converting operation.

The bidirectional switching converter 110 may operate in a forward buck mode (also referred to as a buck mode or a buck single mode), a reverse boost mode (also referred to as a boost mode or a boost single mode), or a forward buck-reverse boost mode (also referred to as a buck-reverse mode or a buck-boost complex mode).

In the forward buck mode, the bidirectional switching converter 110 bucks the input voltage by performing a first switching operation (i.e., the forward buck converting operation) to generate a bucked voltage and charges the battery 200 based on the bucked voltage. In the reverse boost mode, the bidirectional switching converter 110 boosts the input voltage from the battery 200 by performing a second switching operation (i.e., the reverse boost converting operation) to generate a boosted voltage and supplies power to an external device based on the boosted voltage.

In the forward buck-reverse boost mode, the bidirectional switching converter 110 performs a third switching operation (i.e., the forward buck converting operation or the reverse boost converting operation) based on a load current. In the forward buck-reverse boost mode, the bidirectional switching converter 110 may charge the battery 200 or supply power to the external device.

A bidirectional current flowing through a switching transistor included in the bidirectional switching converter 110 is sensed, and the bidirectional switching converter 110 may operate according to a peak current mode control (PCMC) in the forward buck converting operation, based on a sensing current, and may operate according to a valley current mode control (VCMC) in the reverse boost converting operation.

In an embodiment, in the reverse boost mode, the bidirectional switching converter 110 performs the second switching operation according to VCMC in a continuous current section, and performs the second switching operation based on a switching signal having a fixed switching frequency according to voltage mode control (VMC) in a discontinuous current section having a small load current. Therefore, in the discontinuous current section, the bidirectional switching converter 110 may operate in a pulse frequency modulation (PFM) mode to prevent the switching frequency from changing.

The controller 120 may control mode transition among a plurality of switching modes of the bidirectional switching converter 110, e.g., the forward buck mode, the reverse boost mode, and the forward buck-reverse boost mode. In addition, the controller 120 may control the switching operation of the bidirectional switching converter 110 such that a voltage level of an output voltage is equal to or similar to a target voltage level in the plurality of switching modes.

The controller 120 may generate control signals and switching signals for controlling the switching operation in each switching mode of the bidirectional switching converter 110. For example, the controller 120 may receive a sensing current and a voltage from the bidirectional switching converter 110 and generate the control signals and the switching signals, based on the sensing current and the voltage.

In an embodiment, in the reverse boost mode, the controller 120 may control the second switching operation of the bidirectional switching converter 110 according to VCMC in the continuous current section and control the second switching operation based on a switching signal having a fixed switching frequency according to VMC in the discontinuous current section.

In some embodiments, the charging IC 100 may support at least one of various functions, such as an under-voltage lockout (UVLO) function for appropriately operating under power-saving conditions, an over-current protection (OCP) function, an over-voltage protection (OVP) function, a soft-start function for reducing an inrush current, a foldback current limit function, a hiccup mode function for protecting a short circuit, an over-temperature protection (OTP) function, etc.

In an embodiment, the electronic device 10 supports both wired charging and wireless charging, and includes a first power interface 310 for wired charging and a second power interface 320 for wireless charging. In an embodiment, the first power interface 310 may be implemented as a wired power interface and may include a wired charging circuit. The second power interface 320 may be implemented as a wireless power interface and may include a wireless charging circuit. For example, the wired charging circuit and the wireless charging circuit may each include a rectifier, a regulator, and the like.

In the forward buck mode, the charging IC 100 may receive a first input voltage CHGIN from the first power interface 310 and/or a second input voltage WCIN from the second power interface 320, and charge the battery 200 based on the first input voltage CHGIN and/or the second input voltage WCIN.

The charging IC 100 may provide power to the first power interface 310 and/or the second power interface 320 based on a voltage of the battery 200, in the reverse boost mode.

In the forward buck-reverse boost mode, the charging IC 100 may receive the first input voltage CHGIN from the first power interface 310 and charge the battery 200 based on the first input voltage CHGIN or provide power to the second power interface 320 based on the first input voltage CHGIN. Alternatively, the charging IC 100 may receive the second input voltage WCIN from the second power interface 320 and charge the battery 200 based on the second input voltage WCIN or provide power to the first interface 310 based on the second input voltage WCIN. Charging of the battery 200 and power provision to the first power interface 310 or the second power interface 320 may be performed at the same time.

The charging IC 100 may provide power to the second power interface 320 based on the first input voltage CHGIN and the voltage of the battery 200 or provide power to the first power interface 310 based on the second input voltage WCIN and the voltage of the battery 200.

For example, a travel adaptor (TA) or an auxiliary battery may be electrically connected to the first power interface 310. The TA may convert power supplied from alternating current (AC) or from another power supply source into DC power required for charging of the battery 200 and provide the converted power to the electronic device 10. For example, the AC power may be household power with a voltage of 110 V to 220 V and the other power supply source may be a computer. In the forward buck mode or the forward buck-reverse boost mode, the charging IC 100 may charge the battery 200 by using the first input voltage CHGIN received from a TA, an auxiliary battery, etc., or provide power to the second power interface 320.

For example, an on-the-go (OTG) device (e.g., an OTG universal serial bus (USB) device, etc.) may be connected to the first power interface 310, and the charging IC 100 may provide power to the OTG device through the first power interface 310. The charging IC 100 may provide power to the OTG device based on the voltage of the battery 200 in the reverse boost mode or provide power to the OTG device while charging the battery 200 based on the second input voltage WCIN from the second power interface 320 in the forward buck mode.

For example, a wireless power receiving circuit or a wireless power transmitting circuit may be connected to the second power interface 320. In the forward buck mode or the forward buck-reverse boost mode, the charging IC 100 may charge the battery 200 by using the second input voltage WCIN received from the wireless power receiving circuit. Alternatively, the charging IC 100 may provide power to the wireless power transmitting circuit through the second power interface 320. The charging IC 100 may provide power to the wireless power transmitting circuit based on the voltage of the battery 200 in the reverse boost mode or provide power to the wireless power transmitting circuit while charging the battery 200 based on the first input voltage CHGIN from the first power interface 310 in the forward buck mode.

As described above, the electronic device 10 supports wired and wireless charging, and the charging IC 100 is capable of operating in a plurality of switching modes including the forward buck mode, the reverse boost mode, and the forward buck-reverse boost mode to support wired charging and/or wireless charging, wired charging-wireless power supply, and wireless charging-wired power supply, and seamless mode transition among the forward buck mode, the reverse boost mode, and the forward buck-reverse boost mode for stable wireless power supply or wired power supply in spite of an unstable input power source.

The charging IC 100 according to an example embodiment of the inventive concept may operate according to PCMC in the forward buck converting operation and operate according to VCMC in the reverse boost converting operation, based on a sensing current that is a sensed current of a bidirectional current flowing through a switching transistor included in the bidirectional switching converter 110, without a separate additional control. Moreover, the charging IC 100 may generate an error voltage based on an internal voltage of the bidirectional switching converter 110 and control switching operations of the plurality of switching modes based on the error voltage, thereby achieving seamless mode transition. Moreover, the charging IC 100 may operate based on the fixed switching frequency in the discontinuous current section in the boost mode, thereby preventing over-current from being generated by change of a control method.

Figure 2:
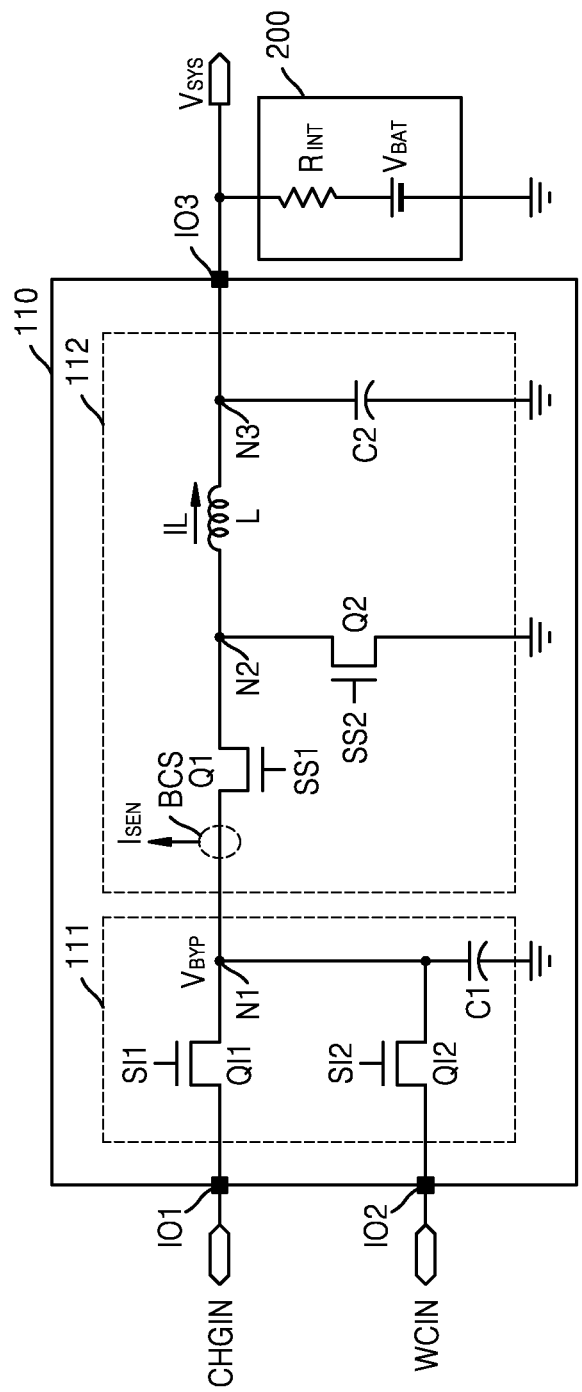
FIG. 2 is a circuit diagram showing a bidirectional switching converter according to an example embodiment of the inventive concept.

FIG. 2 is a circuit diagram showing a bidirectional switching converter according to an example embodiment of the inventive concept.

Referring to FIG. 2, the bidirectional switching converter 110 includes an input/output selecting circuit 111 and a switching circuit 112.

The input/output selecting circuit 111 includes a first input transistor QI1 and a second input transistor QI2. The first input transistor QI1 is connected to a first input/output terminal IO1 and a first node N1, and the second input transistor QI2 is connected to a second input/output terminal IO2 and the first node N1. The input/output selecting circuit 111 may further include a first capacitor C1 connected to the first node N1 and a node providing a ground to stabilize an input voltage or an output voltage.

The first input transistor QI1 may be turned on or turned off in response to a first input control signal SI1, and the second input transistor QI2 may be turned on or turned off in response to a second input control signal SI2. The first input control signal SI1 may be applied to a gate of the first input transistor QI1 and the second input control signal SI2 may be applied to a gate of the second input transistor QI2. For example, when the first input voltage CHGIN is applied to the first input/output terminal IO1 or a first wired power interface (e.g., 310 of FIG. 1) is connected to the first input/output terminal IO1, the first input control signal SI1 may have an active level and the first input transistor QI1 may be turned on in response to the first input control signal SI1. When the second input voltage WCIN is applied to the second input/output terminal IO2 or the second wireless power interface (e.g., 320 of FIG. 2) is connected to the second input/output terminal IO2, the second input control signal SI2 may have an active level and the second input transistor QI2 may be turned on in response to the second input control signal SI2. The first input control signal SI1 and the second input control signal SI2 may be received from a controller (120 of FIG. 1).

The switching circuit 112 includes a first switching transistor Q1, a second switching transistor Q2, a bidirectional current sensor BCS, an inductor L, and a second capacitor C2.

The first switching transistor Q1 is connected between the first node N1 and the second node N2, and the second switching transistor Q2 is connected between the second node N2 and a node providing a ground GND. The second node N2 may be referred to as a switching node.

The first switching transistor Q1 may be turned on or turned off in response to a first switching signal SS1, and the second switching transistor Q2 may be turned on or turned off in response to a second switching signal SS2. In an embodiment, the first switching signal SS1 and the second switching signal SS2 are periodic signals having frequencies that change according to a bucking rate in the forward buck converting operation and a boosting rate in the reverse boost converting operation. In an embodiment, in a continuous current section of the forward buck mode, the forward buck-reverse boost mode, and the reverse boost mode, the first switching signal SS1 and the second switching signal SS2 are complementary signals.

The inductor L is connected between the second node N2 and the third node N3, and may be charged or discharged according to an on and an off of the first switching transistor Q1 and the second switching transistor Q2. The second capacitor C2 is connected between the third node N3 and a node providing a ground. The third node N3 may be an input/output node. The third node N3 may be an output node when the bidirectional switching converter 110 performs the buck converting operation, and the third node N3 may be an input node when the bidirectional switching converter 110 performs the boost converting operation.

According to the buck converting operation and the boost converting operation of the bidirectional switching converter 110, a direction of a current IL flowing through the inductor L (hereinafter, referred to as an inductor current) may change. The inductor current IL may flow in a direction from the second node N2 to the third node N3 (e.g., a forward direction) when the bidirectional switching converter 110 performs the forward buck converting operation, and the inductor current IL may flow in a direction from the third node N3 to the second node N2 (e.g., a reverse direction) when the bidirectional switching converter 110 performs the reverse boost converting operation.

The bidirectional current sensor BCS may sense a current (hereinafter, a first current) flowing through the first switching transistor Q1. The first current may flow from the first node N1 to the second node N2 in the forward buck converting operation of the bidirectional switching converter 110, and the first current may flow from the second node N2 to the first node N1 in the reverse boost converting operation of the bidirectional switching converter 110. The bidirectional current sensor BCS may sense the bidirectional first current flowing through the first switching transistor Q1 to generate a sensing current $I_{SEN}$. In an embodiment, the bidirectional current sensor BCS generates a mirror current mirrored from the first current flowing through the first switching transistor Q1 and adds an offset to the mirror current to generate the sensing current $I_{SEN}$. Between the first node N1 and the third node N3, a direction of the inductor current IL and a direction of the first current may be the same as each other and the sensing current $I_{SEN}$ may be related to the inductor current IL.

A voltage of the first node N1 (e.g., a bypass voltage $V_{BYP}$) and the sensing current $I_{SEN}$ may be provided to the controller (120 of FIG. 1), and the controller 120 may generate a first switching signal SS1 and a second switching signal SS2, based on the bypass voltage $V_{BYP}$ and the sensing current $I_{SEN}$.

The bidirectional switching converter 110 may operate as a buck converter in a partial section of the forward buck mode or the forward buck-reverse boost mode, and buck the first input voltage CHGIN and/or the second input voltage WCIN to generate a bucked output voltage (e.g., a first output voltage). The first output voltage may be output as a system voltage $V_{SYS}$ through the third input/output terminal IO3. The first output voltage may also charge the battery 200. The battery 200 may include an internal resistor $R_{INT}$ and a battery voltage $V_{BAT}$ of the charged battery 200 may be equal to the first output voltage.

The bidirectional switching converter 110 may operate as a boost converter in another partial section of the reverse boost mode or the forward buck-reverse boost mode, and boost the battery voltage $V_{BAT}$ to generate an output voltage (e.g., a second output voltage). The second output voltage may be output through the first node N1 and at least one of the first input/output terminal IO1 and the second input/output terminal IO2, and the bidirectional switching converter 110 may provide power to a first power interface (310 of FIG. 1) and/or a second power interface (320 of FIG. 1) based on the second output voltage.

Figure 3A:
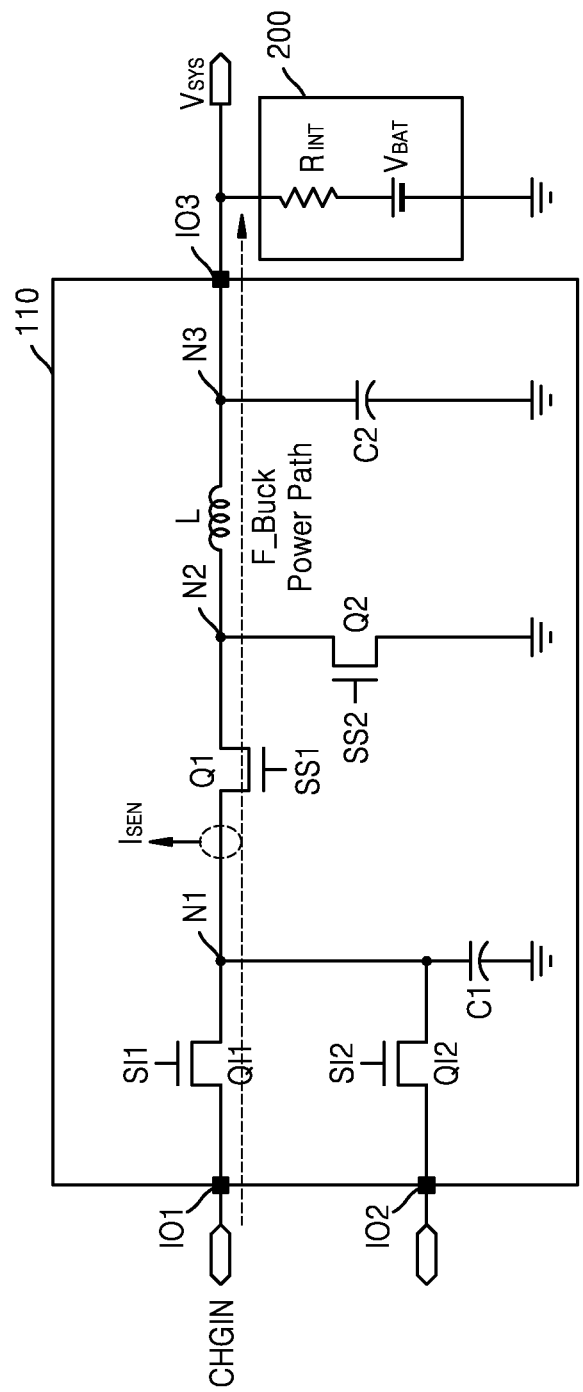
FIGS. 3A and 3B show a power path in a forward buck converting operation of a bidirectional switching converter, according to an example embodiment of the inventive concept.
Figure 3B:
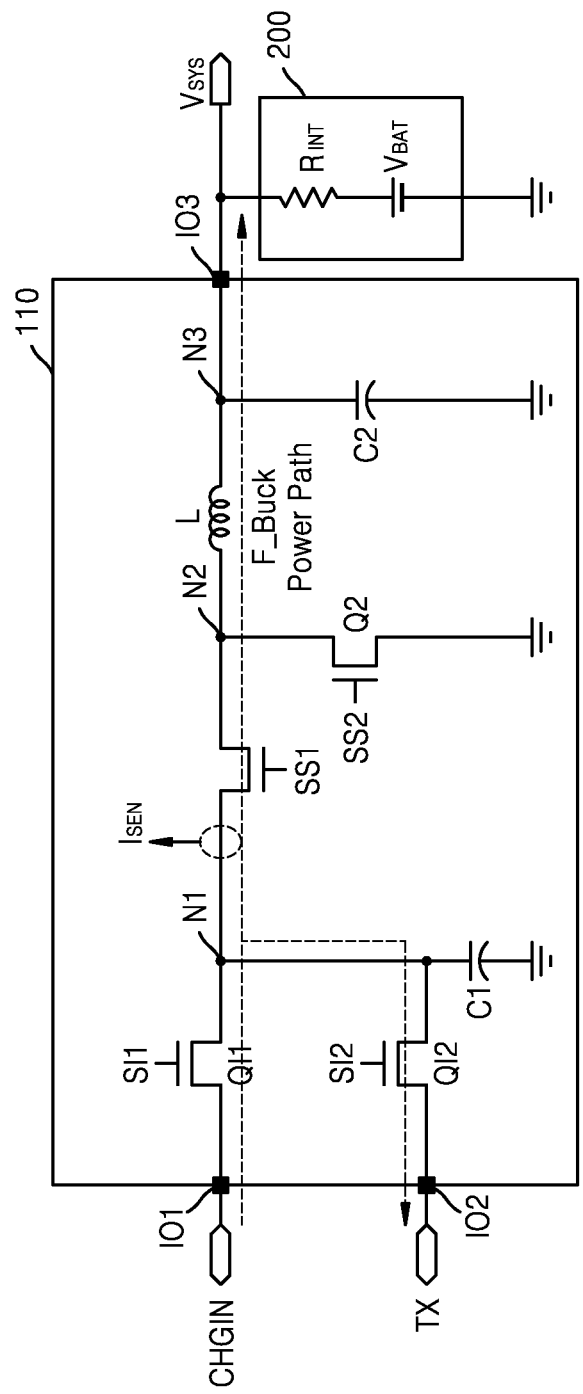

FIGS. 3A and 3B show a power path in a forward buck converting operation of a bidirectional switching converter, according to an example embodiment of the inventive concept. It is assumed in FIG. 3A that the first input voltage CHGIN is applied to the first input/output terminal IO1, and it is assumed in FIG. 3B that the first input voltage CHGIN is applied to the first input/output terminal IO1 and a wireless power transmitting circuit TX is connected to the second input/output terminal IO2.

Referring to FIG. 3A, the first input voltage CHGIN may be applied from a first input power source, e.g., the first power interface 310 of FIG. 2, and the first input transistor QI1 may be turned on in response to the first input control signal SI1 having the active level. The second input control signal SI2 may have an inactive level, and the second input transistor QI2 may be turned off in response to the second input control signal SI2.

The bidirectional switching converter 110 may perform the forward buck converting operation based on the first input voltage CHGIN to charge the battery 200 and supply power to an internal system of an electronic device (10 of FIG. 1). When the first switching transistor Q1 is turned on in response to the first switching signal SS1 having the active level, current supplied from the first input power source may be provided to the battery 200 and/or an internal system of the electronic device 10 through the inductor L. Therefore, a power path may be formed from the first input/output terminal IO1 to a third input/output terminal IO3. Here, the first power path in the direction from the first node N1 to the third node N3 may be referred to as a forward buck (F_Buck) power path.

Referring to FIG. 3B, the second power interface (320 of FIG. 1), e.g., the wireless power transmitting circuit TX, may be connected to the second input/output terminal IO2, and the second input transistor QI2 may be turned on in response to the second input control signal SI2 having the active level.

The first input power source may provide power to the wireless power transmitting circuit TX through the first input transistor QI1 and the second input transistor QI2. Therefore, in addition to a forward buck power path from the first input/output terminal IO1 to the third input/output terminal IO3, formed according to the forward buck converting operation of the bidirectional switching converter 110, a power path may be formed from the first input/output terminal IO1 to the second input/output terminal IO2.

FIGS. 3A and 3B show the forward buck (F_Buck) power path formed from the first input/output terminal IO1 to the third input/output terminal IO3 when the bidirectional switching converter 110 performs the forward buck converting operation based on the first input voltage CHGIN provided from the first power interface 310. However, the inventive concept is not limited thereto, and the bidirectional switching converter 110 may perform the forward buck converting operation based on the second input voltage WCIN provided from the wireless power interface, the forward buck (F_Buck) power path may be formed from the second input/output terminal IO2 to the third input/output terminal IO3, and a power path may be formed from the second input/output terminal IO2 to the first input/output terminal IO1.

Figure 4A:
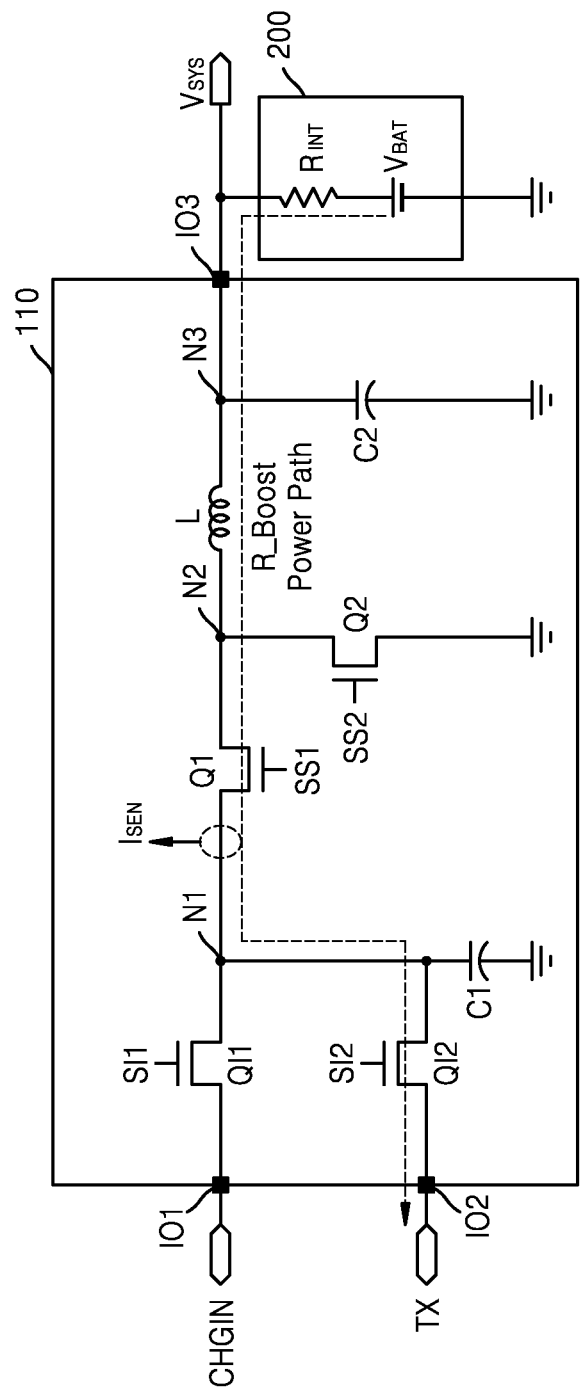
FIGS. 4A and 4B show a power path in a reverse boost converting operation of a bidirectional switching converter, according to an example embodiment of the inventive concept.
Figure 4B:
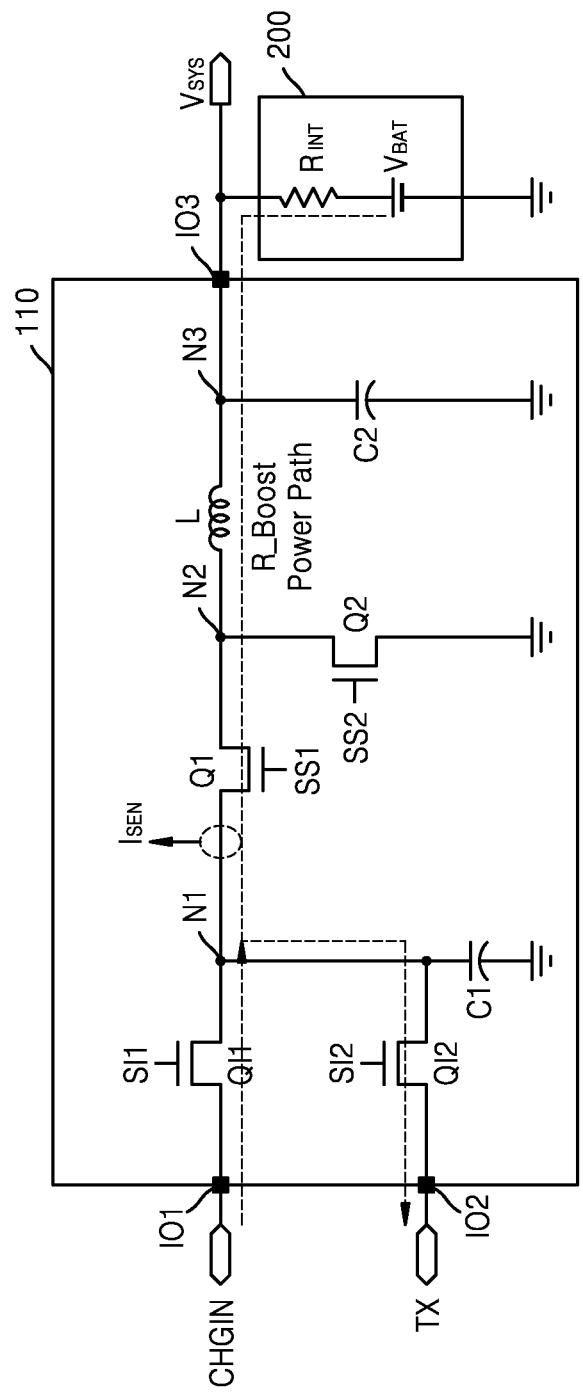

FIGS. 4A and 4B show a power path in a reverse boost converting operation of a bidirectional switching converter, according to an example embodiment of the inventive concept. It is assumed in FIG. 4A that the wireless power transmitting circuit TX is connected to the second input/output terminal IO2, the first input voltage CHGIN is applied to the first input/output terminal IO1.

Referring to FIG. 4A, the second input transistor QI2 is turned on in response to the second input control signal SI2 having the active level. The first input control signal SI1 may have the inactive level, and the first input transistor QI1 is turned off in response to the first input control signal SI1.

The bidirectional switching converter 110 may perform the reverse boost converting operation based on an input voltage provided to the battery 200, e.g., the battery voltage $V_{BAT}$, to provide a current provided from the battery 200 to the wireless power transmitting circuit TX. Therefore, a power path may be formed from the third input/output terminal IO3 to the second input/output terminal IO2. Herein, the second power path from the third node N3 to the first node N1 may be referred to as a reverse boost (R_Boost) power path.

Referring to FIG. 4B, the first input voltage CHGIN may be applied to the first input/output terminal IO1. A current supplied from the first input power source for providing the first input voltage CHGIN, e.g., first power interface 310 and the battery 200 of FIG. 2, may be provided to the wireless power transmitting circuit TX through the second input terminal IO2. The first input transistor QI1 is turned on in response to the first input control signal SI1 having the active level.

The first input power source may provide power to the wireless power transmitting circuit TX through the first input transistor QI1 and the second input transistor QI2. Therefore, in addition to a reverse boost power path from the third input/output terminal IO3 to the second input/output terminal IO2, formed according to the reverse boost converting operation of the bidirectional switching converter 110, a power path may be formed from the first input/output terminal IO1 to the second input/output terminal IO2.

For example, when the first input power source provides power to the wireless power transmitting circuit TX and the power supplied from the first input power source fails to reach a power level required in the wireless power transmitting circuit TX, the bidirectional switching converter 110 may perform the reverse boost converting operation, thereby providing additional power from the battery 200 to the wireless power transmitting circuit TX.

FIGS. 4A and 4B show the forward buck (R_Boost) power path formed from the third input/output terminal IO3 to the second input/output terminal IO2 when the bidirectional switching converter 110 performs the reverse buck converting operation to provide power to the wireless power transmitting circuit TX connected to the second input/output terminal IO2. However, the inventive concept is not limited thereto, and the bidirectional switching converter 110 may perform the reverse buck converting operation to provide power to a device connected to the first input/output terminal IO1, e.g., an OTG device, and the reverse boost (R_Boost) power path from the third input/output terminal IO3 to the first input/output terminal IO1 may be formed.

Figure 5:
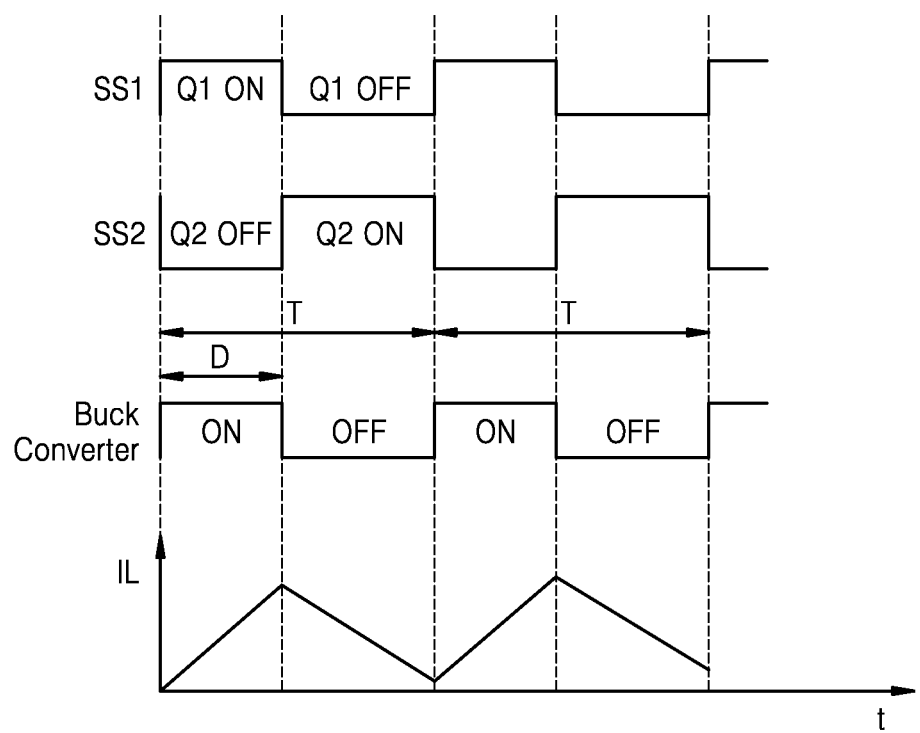
FIG. 5 is a waveform diagram showing switching signals, a state of a buck converter, and an inductor current when a bidirectional switching converter performs a forward buck converting operation, according to an example embodiment of the inventive concept.

FIG. 5 is a waveform diagram showing switching signals, a state of a buck converter, and an inductor current when a bidirectional switching converter performs a forward buck converting operation, according to an example embodiment of the inventive concept. A description will be made with reference to FIG. 2.

Referring to FIGS. 2 and 5, the bidirectional switching converter 110 may perform the forward buck converting operation in response to the first switching signal SS1 and the second switching signal SS2. That is, the bidirectional switching converter 110 may operate as a buck converter.

The first switching signal SS1 and the second switching signal SS2 may have a specific frequency. In an embodiment, when the first switching signal SS1 has an active level, the second switching signal SS2 has an inactive level, and when the second switching signal SS2 has an active level, the first switching signal SS1 has an inactive level. In an embodiment, the first switching signal SS1 and the second switching signal SS2 are complementary signals.

The first switching transistor Q1 and the second switching transistor Q2 may operate in response to the first switching signal SS1 and the second switching signal SS2, respectively. The first switching transistor Q1 may be turned on when the first switching signal SS1 has the active level (e.g., logic high), and the first switching transistor Q1 may be turned off when the first switching signal SS1 has the inactive level (e.g., logic low). The second switching transistor Q2 may be turned on when the second switching signal SS2 has the active level (e.g., logic high), and the second switching transistor Q2 may be turned off when the second switching signal SS2 has the inactive level (e.g., logic low).

An on state and an off state of the buck converter may be determined based on a state of the first switching transistor Q1. When the first switching transistor Q1 is in a turned-on state, the buck converter is in the on state. The second switching transistor Q2 may be in a turned-off state. A current provided from at least one input power source that provides the first input voltage CHGIN and/or the second input voltage WCIN may be provided to a load, e.g., the battery 200 and/or a system through the inductor L. The inductor L may be charged (store energy), and an output voltage lower than an input voltage may be generated. The inductor current IL in the forward direction (the direction from the second node N2 to the third node N3), flowing through the inductor L, may linearly increase over time.

When the first switching transistor Q1 is in the turned-off state, the buck converter is in the off state. The second switching transistor Q2 may be in the turned-on state, and the inductor current IL is generated from energy stored in the inductor L and may be provided to the load. In this case, the inductor current IL in the forward direction may linearly decrease over time.

The on state and the off state of the buck converter may be repeated in all periods T, such that an output voltage that is a bucked input voltage may be generated. A ratio of an output voltage to an input voltage may be determined by a ratio of a time duration D of an on state with respect to one period T of the buck converter, i.e., a duty ratio.

Figure 6:
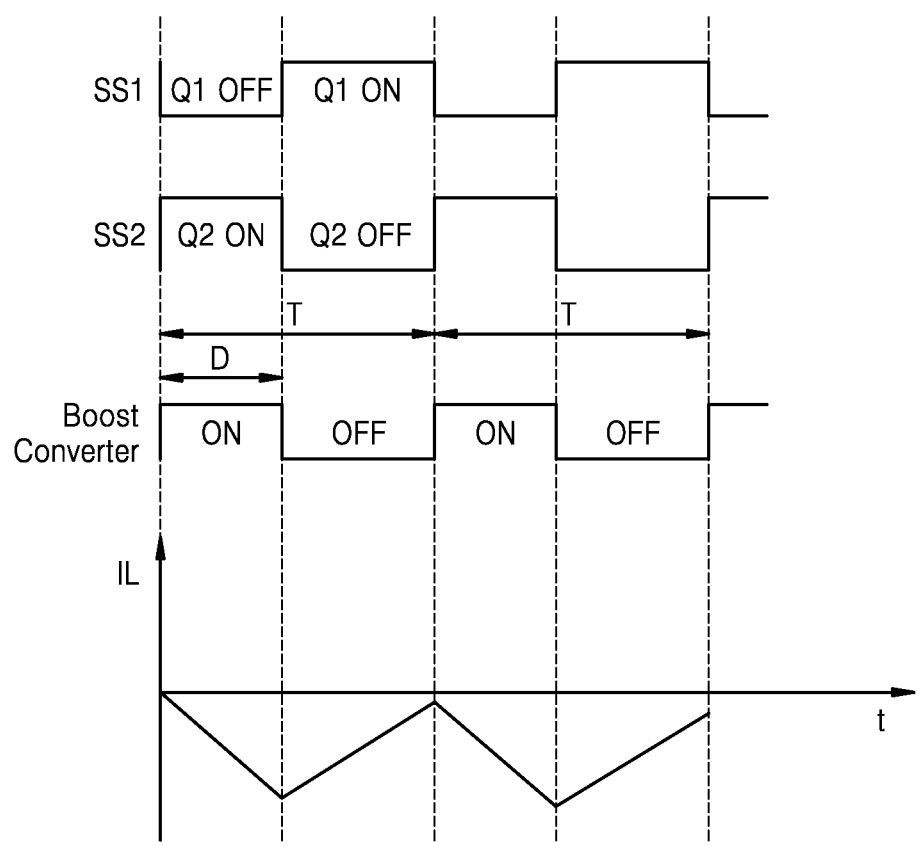
FIG. 6 is a waveform diagram showing switching signals, a state of a buck converter, and an inductor current when a bidirectional switching converter performs a reverse boost converting operation, according to an example embodiment of the inventive concept.

FIG. 6 is a waveform diagram showing switching signals, a state of a buck converter, and an inductor current when a bidirectional switching converter performs a reverse boost converting operation, according to an example embodiment of the inventive concept. A description will be made with reference to FIG. 2.

Referring to FIGS. 2 and 6, the bidirectional switching converter 110 performs the reverse boost converting operation in response to the first switching signal SS1 and the second switching signal SS2. That is, the bidirectional switching converter 110 may operate as a boost converter.

The first switching signal SS1, the second switching signal SS2, and operations of the first switching transistor Q1 and the second switching transistor Q2 based on the first switching signal SS1 and the second switching signal SS2 are described above with reference to FIG. 3 and thus redundant description thereof will not be provided.

An on state and an off state of the boost converter may be determined based on a state of the second switching transistor Q2. When the second switching transistor Q2 is in the turned-on state, the boost converter is in the on state. The first switching transistor Q1 may be in the turned-off state. The current provided from the battery 200 may flow through a closed circuit formed by the inductor L and the second switching transistor Q2 and may charge the inductor L An absolute value of the inductor current IL in the reverse direction may linearly increase over time.

When the second switching transistor Q2 is in the turned-off state, the boost converter is in the off state. The first switching transistor Q1 is in the turned-on state, and in addition to the current output from the input power source, e.g., the battery 200, as the current charged in the inductor L is discharged, and an output voltage higher than an input voltage, e.g., the battery voltage $V_{BAT}$, may be generated.

The current output from the battery 200 and the current output from the inductor L may be provided to the first power interface 310, e.g., the OTG device and/or the second power interface 320, e.g., the wireless power transmission circuit. An absolute value of the inductor current IL in the reverse direction (the direction from the third node N3 to the second node N2), flowing through the inductor L, may linearly decrease over time.

The on state and the off state of the boost converter may be repeated in all periods T, such that an output voltage that is a boosted input voltage may be generated. A ratio of the output voltage to the input voltage may be determined by a ratio of the time duration D of the on state with respect to the period T of the boost converter, i.e., a duty ratio.

Figure 7:
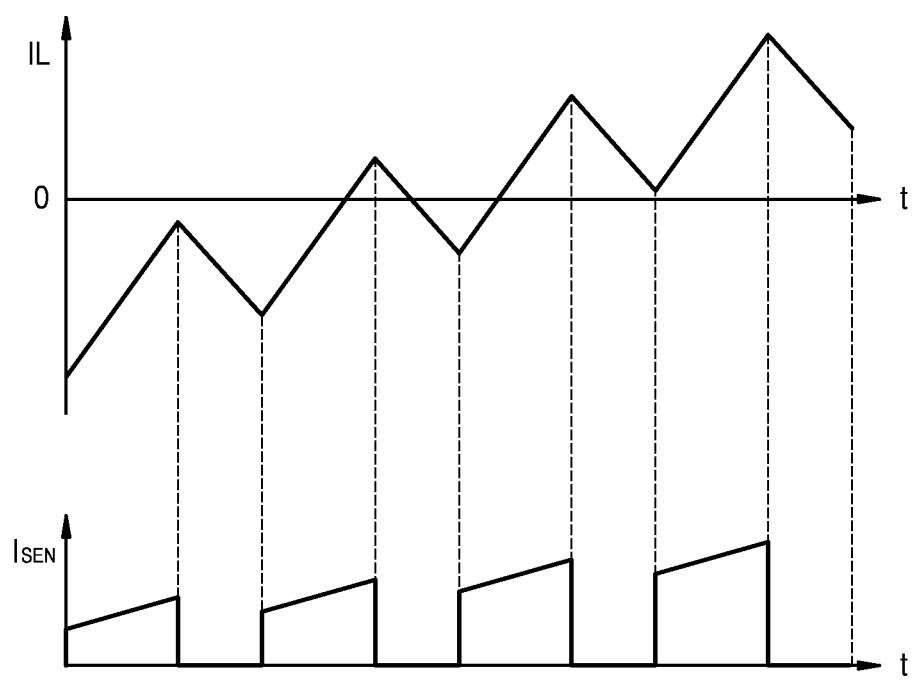
FIG. 7 is a graph showing an inductor current and a sensing current of a bidirectional switching converter, according to an example embodiment of the inventive concept.

FIG. 7 is a graph showing an inductor current and a sensing current of a bidirectional switching converter, according to an example embodiment of the inventive concept.

Referring to FIGS. 2 and 7, the inductor current IL may have a positive value when the inductor current IL flows in the forward direction, e.g., from the second node N2 to the third node N3, and the inductor current IL may have a negative value when the inductor current IL flows in the reverse direction, e.g., from the third node N3 to the second node N2.

When the inductor current IL has a positive value, the bidirectional switching converter 110 may perform the forward buck converting operation. The first switching transistor Q1 is turned on and the second switching transistor Q2 is turned off in a period in which the inductor current IL has a positive value and the amount of current increases, such that the current flowing through the first switching transistor Q1 may be the same as the inductor current IL.

When the inductor current IL has a negative value, the bidirectional switching converter 110 may perform the reverse boost converting operation. The inductor current IL has a negative value, and the first switching transistor Q1 is turned on and the second switching transistor Q2 is turned off in a period in which the amount of current decreases, i.e., an absolute value of the inductor current IL decreases, such that the current flowing through the first switching transistor Q1 may be the same as the inductor current IL.

As described with reference to FIG. 2, the bidirectional current sensor BCS may generate the sensing current $I_{SEN}$ by sensing the first current flowing through the first switching transistor Q1. The first current may have a positive value or a negative value, and an offset may be added to the first current such that the sensing current $I_{SEN}$ having a positive value may be generated.

In a period in which the inductor current IL has a positive value and the amount of current decreases and in a period in which the inductor current IL has a negative value and the amount of current increases, that is, in a period in which the absolute value of the inductor current IL increases, the first switching transistor Q1 is in the turned-off state, the current does not flow, and the sensing current $I_{SEN}$ may be '0'.

When controlling the switching operation of the buck converter and the boost converter, the controller 120 may control a switching operation based on a peak current of a main switching transistor that determines the on states of the buck converter and the boost converter. That is, time durations of the on states of the buck converter and the boost converter may be determined based on the peak current of the main switching transistor. For example, the controller 120 may control a switching operation based on the peak current of the first switching transistor Q1, when the bidirectional switching converter 110 performs the buck converting operation, and the controller 120 may control the switching operation based on the peak current of the second switching transistor Q2, when the bidirectional switching converter 110 performs the boost converting operation.

However, when the switching operation is controlled based on different sensing signals (e.g., the current of the first switching transistor Q1 and the current of the second switching transistor Q2) according to the converting operating of the bidirectional switching converter 110 in this way, discontinuity of overshoot or undershoot may occur in a transition between the forward buck converting operation and the reverse boost converting operation due to discontinuity between the sensing signals.

To prevent this, in the charging IC (100 of FIG. 1) according to an embodiment of the inventive concept, the bidirectional current sensor BCS senses the first current flowing bidirectionally through the first switching transistor Q1, and the bidirectional switching converter 110 controls the switching operation based on the peak current of the first current when performing the forward buck converting operation and controls the switching operation based on a valley current of the first current when performing the reverse boost converting operation.

Figure 8:
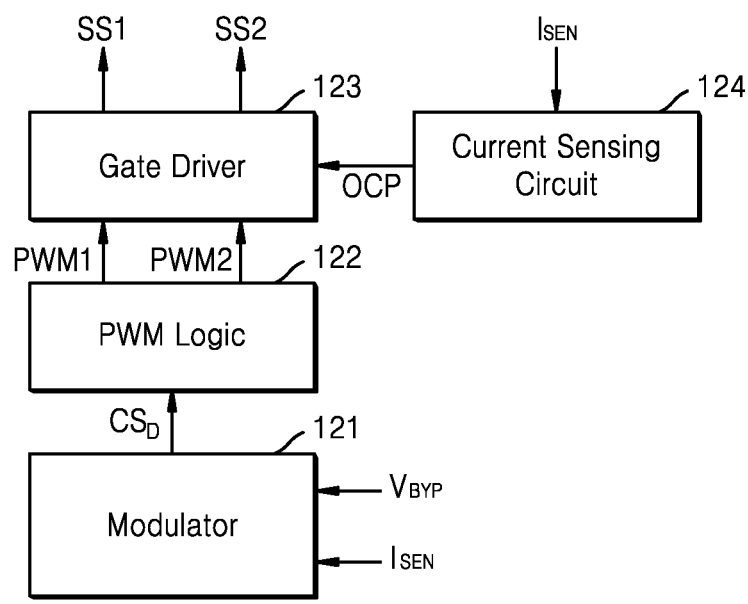
FIG. 8 is a block diagram schematically showing a controller that controls a bidirectional switching converter, according to an example embodiment of the inventive concept.

FIG. 8 is a block diagram schematically showing a controller that controls a bidirectional switching converter, according to an example embodiment of the inventive concept.

Referring to FIG. 8, the controller 120 includes a modulator 121, pulse width modulation (PWM) logic 122, a gate driver 123, and a current sensing circuit 124.

The modulator 121 may receive the bypass voltage $V_{BYP}$ and the sensing current $I_{SEN}$ and generate a duty ratio control signal $CS_D$ based on them. The modulator 121 may generate an error voltage ($V_{ERR}$ of FIG. 9) based on the bypass voltage $V_{BYP}$, generate a ramp voltage ($V_{RMP}$ of FIG. 9) based on the sensing current $I_{SEN}$, and compare the error voltage $V_{ERR}$ with the ramp voltage $V_{RMP}$ to generate the duty ratio control signal $CS_D$. The duty ratio control signal $CS_D$ may be a PWM signal with a logic high level and a logic low level that are repeated in one period.

The PWM logic 122 may generate a first PWM signal PWM1 and a second PWM signal PWM2 based on the duty ratio control signal $CS_D$. In an embodiment, a duty ratio of the first PWM signal PWM1 is determined based on the duty ratio control signal $CS_D$, and the second PWM signal PWM2 is a complementary signal of the first PWM signal PWM1.

The gate driver 123 may generate the first switching signal SS1 and the second switching signal SS2 based on the first PWM signal PWM1 and the second PWM signal PWM2. The gate driver 123 may include a level shifter and adjust voltage levels of the first PWM signal PWM1 and the second PWM signal PWM2 to generate the first switching signal SS1 and the second switching signal SS2 having voltage levels for turning on or turning off the first input transistor (Q1 of FIG. 2) and the second input transistor (Q2 of FIG. 2).

The gate driver 123 may receive an over-current protection signal OCP from the current sensing circuit 124 and control an active level duration of the first switching signal SS1 or the second switching signal SS2 based on the over-current protection signal OCP. For example, the gate driver 123 may switch the first switching signal SS1 to logic low when the over-current protection signal OCP is generated. Therefore, the first switching transistor Q1 may be turned off, thereby preventing over-current from flowing through the inductor L or the unintended inductor current IL in the reverse direction from flowing.

The current sensing circuit 124 may generate the over-current protection signal OCP based on the sensing current $I_{SEN}$. That is, the current sensing circuit 124 may generate the over-current protection signal OCP based on the first current flowing through the first switching transistor (Q1 of FIG. 2). When the bidirectional switching converter 110 operates in the forward buck-reverse boost mode or the reverse boost mode, the over-current protection signal OCP may be a zero-current sensing signal indicating that the inductor current IL is '0'.

In an embodiment, the current sensing circuit 124 generates the over-current protection signal OCP when the sensing current $I_{SEN}$ is greater than or equal to a first reference value or less than or equal to a second reference value. In each switching mode including the forward buck mode, the forward buck-reverse boost mode, and the reverse boost mode, the first reference value and the second reference value may be set differently.

Figure 9:
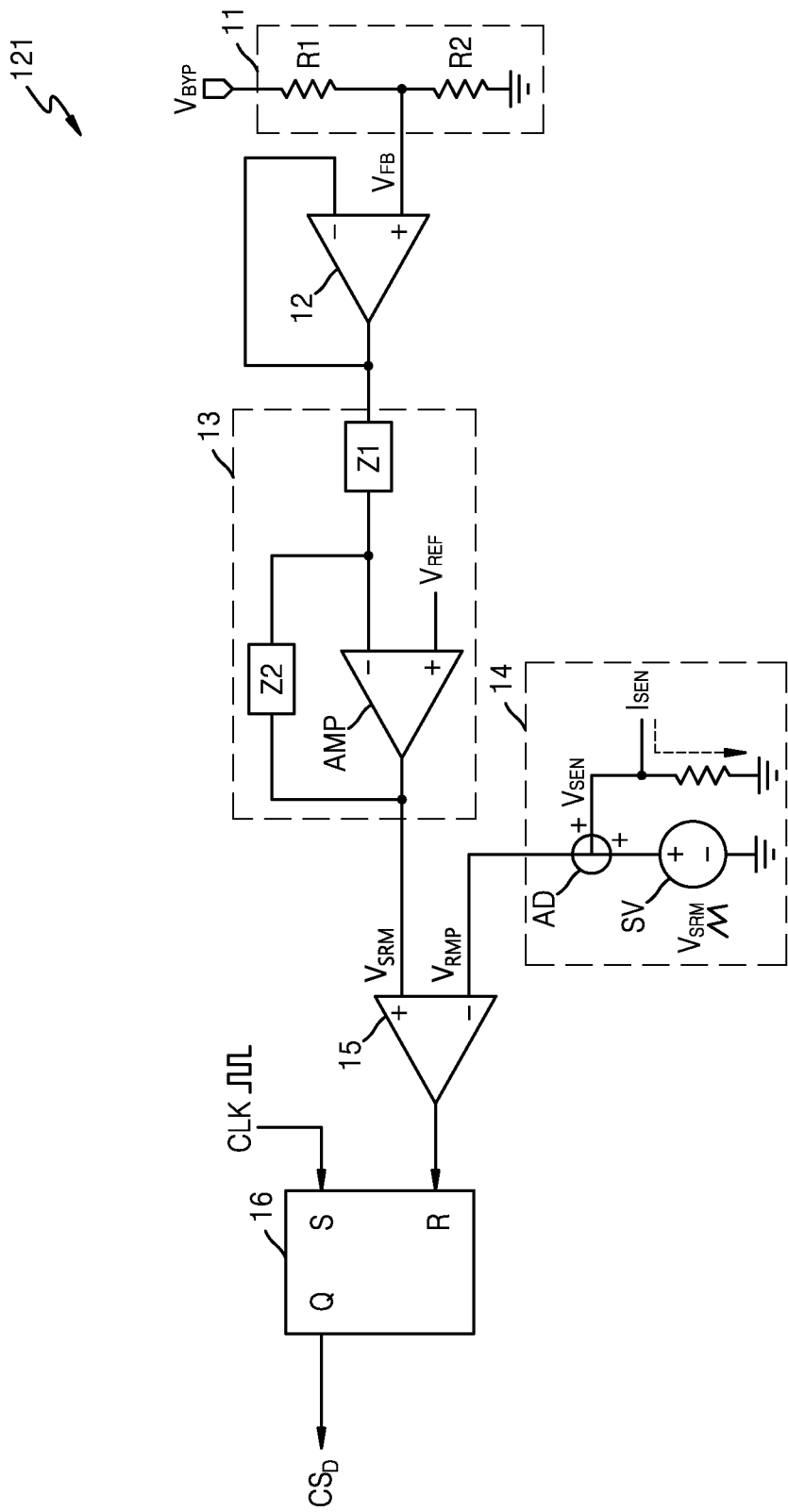
FIG. 9 is a circuit diagram schematically showing a modulator of FIG. 8.

FIG. 9 is a circuit diagram schematically showing a modulator of FIG. 8.

Referring to FIG. 9, the modulator 121 includes a voltage divider 11, a buffer 12, an error amplification circuit 13, a ramp voltage generation circuit 14, and a set-reset (SR) latch 16.

The voltage divider 11 may include a first resistor R1 and a second resistor R2, and divide the bypass voltage $V_{BYP}$ by using the first resistor R1 and the second resistor R2 to output a feedback voltage $V_{FB}$. The buffer 12 may buffer the feedback voltage $V_{FB}$.

The error amplification circuit 13 may generate the error voltage $V_{ERR}$ based on a reference voltage $V_{REF}$ and the feedback voltage $V_{FB}$. The error amplification circuit 13 may include an amplifier AMP (e.g., a differential amplifier, an operational transconductance amplifier (OTA), etc.) and passive elements Z1 and Z2 such as resistors and a capacitor. The reference voltage $V_{REF}$ may be applied to a first input terminal (+) of the amplifier AMP, the passive elements Z1 and Z2 may be connected to a second input terminal (−) of the amplifier AMP, and the buffered feedback voltage may be applied to the passive element Z1. A resistor and a capacitor may be connected between the second input terminal (−) of the amplifier AMP and the output terminal. A voltage difference between the reference voltage $V_{REF}$ and the buffered feedback voltage may be amplified according to an impedance ratio between passive elements, thus being output as the error voltage $V_{ERR}$.

The ramp voltage generation circuit 14 may generate the ramp voltage $V_{RMP}$ for comparison with the error voltage $V_{ERR}$ based on the sensing current $I_{SEN}$. The ramp voltage generation circuit 14 may include a sawtooth wave generator SV, a resistor, and an adder AD. The sensing current $I_{SEN}$ may be applied to the resistor, such that a sensing voltage VSEN may be generated. As shown in FIG. 7, the sensing current $I_{SEN}$ may be a lamp signal and the sensing voltage VSEN may be a lamp signal. The sawtooth wave generator SV may provide a sawtooth wave ramp voltage $V_{SRM}$, and the adder AD may generate a ramp voltage $V_{RMP}$ by adding the sawtooth wave ramp voltage $V_{SRM}$ to the sensing voltage VSEN. That is, the ramp voltage generation circuit 14 may generate the ramp voltage $V_{RMP}$ by compensating for the sensing voltage VSEN based on the sawtooth wave ramp voltage $V_{SRM}$.

A comparator 15 may compare the error voltage $V_{ERR}$ with the ramp voltage $V_{RMP}$. The comparator 15 may output a logic low signal when the error voltage $V_{ERR}$ is higher than the ramp voltage $V_{RMP}$, and the comparator 15 may output a logic high signal when the error voltage $V_{ERR}$ is lower than or equal to the ramp voltage $V_{RMP}$.

The SR latch 16 may generate a reference duty ratio control signal $CS_D$ based on a clock signal CLK and an output signal of the comparator 15. When the output signal of the comparator 15 is logic low and the clock signal CLK is logic high, the duty ratio control signal $CS_D$ may be logic high, and even when the clock signal CLK is switched to logic low, the duty ratio control signal $CS_D$ may maintain a logic high. Thereafter, when the output signal of the comparator 15 is switched to a logic high, the SR latch 16 may be reset such that the duty ratio control signal $CS_D$ may be switched to a logic low. The duty ratio control signal $CS_D$ may have a certain frequency according to the clock signal CLK, and a duration (i.e., an on duration) in which the first switching signal SS1 and the second switching signal SS2 have active levels may be determined according to a logic high duration of the duty ratio control signal $CS_D$.

As described above with reference to FIGS. 8 and 9, the charging IC (100 of FIG. 1) according to an embodiment of the inventive concept may control a switching operation of the bidirectional switching converter 110 based on the sensing current $I_{SEN}$ generated by sensing a bidirectional current flowing through the first switching transistor Q1, and the error voltage $V_{ERR}$. A first switching operation in the forward buck mode, a second switching operation in the reverse boost mode, and a third switching operation in the forward buck-reverse boost mode in the bidirectional switching converter 110 may be all controlled based on the sensing current $I_{SEN}$ and the error voltage $V_{ERR}$, thereby achieving seamless mode transition among the modes.

Figure 10:
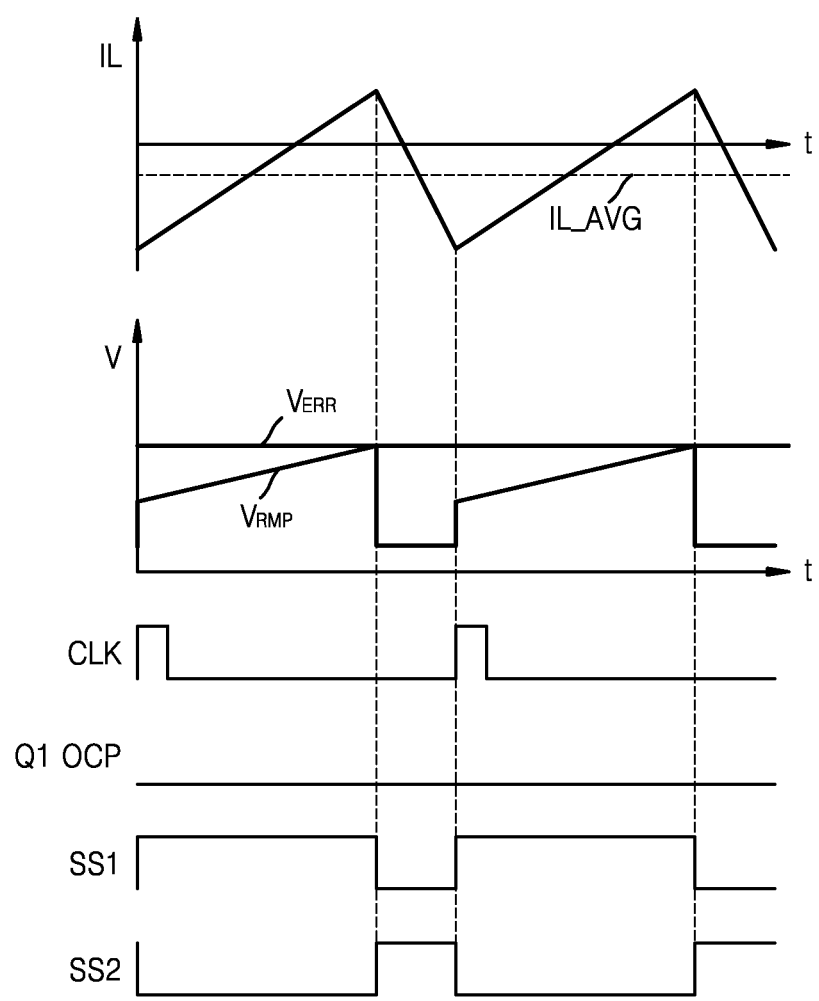
FIG. 10 is a graph showing an inductor current and control signals when a bidirectional switching converter operates in a forward buck-reverse boost mode, according to an example embodiment of the inventive concept.

FIG. 10 is a graph showing an inductor current and control signals when a bidirectional switching converter operates in a forward buck-reverse boost mode, according to an example embodiment of the inventive concept.

In the forward buck-reverse boost mode, the inductor current IL needs to flow bidirectionally, such that the bidirectional switching converter 110 may operate in a forced continuous conduction mode (CCM). The second reference value for setting zero-current sensing is set excessively low, such that the over-current protection signal OCP generated based on the current of the first switching transistor Q1 is not generated. Therefore, the inductor current IL may flow bidirectionally.

When the clock signal CLK is switched from a logic low to a logic high, the first switching signal SS1 may be switched from a low level to a high level and the second switching signal SS2 may be switched from a high level (an on level) to a low level (an off level). The ramp voltage $V_{RMP}$ may increase. The inductor current IL may increase and even when the inductor current IL increases from a negative value to '0', the over-current protection signal OCP is not generated, such that the inductor current IL may increase to a positive value.

When the ramp voltage $V_{RMP}$ becomes equal to the error voltage $V_{ERR}$, the first switching signal SS1 may be switched from the high level to the low level and the second switching signal SS2 may be switched from the low level to the high level. Therefore, the inductor current IL may decrease. The ramp voltage $V_{RMP}$ may be reset.

Thereafter, when the clock signal CLK is switched from logic low to logic high, the first switching signal SS1 may be switched from the low level to the high level and the second switching signal SS2 may be switched from the high level (the on level) to the low level (the off level), and the operation described above may be repeated.

As such, the on duration of the first switching signal SS1 and the off duration of the second switching signal SS2 may be determined based on the ramp voltage $V_{RMP}$ generated based on the sensing current ($I_{SEN}$ of FIG. 9) and the error voltage $V_{ERR}$.

Meanwhile, for stable power supply, transition from the forward buck-reverse boost mode (the buck-boost complex mode) to the forward buck mode (the buck single mode) may be implemented with an existing buck converting operation. However, transition from the forward buck-reverse boost mode to the reverse boost mode (the reverse single mode) is difficult to implement with an existing boost converting operation.

As described above with reference to FIG. 1, when the bidirectional switching converter 110 performs the reverse boost converting operation, the bidirectional switching converter 110 may operate according to VCMC. In VCMC, when a load current decreases, i.e., the absolute value of the inductor current IL decreases, mode transition occurs from the CCM to the PFM mode, and in the PFM mode, a switching operation is controlled hysterically based on an output voltage, such that the error voltage $V_{ERR}$ is not continuously controlled in a CCM-operating section and in a PFM-operating section and thus seamless mode transition is difficult to achieve.

The charging IC 100 according to an embodiment of the inventive concept may operate in a fixed frequency discontinuous conduction mode (DCM) in the reverse boost mode to facilitate transition from the forward buck-reverse boost mode to the reverse boost mode. This will be described with reference to FIGS. 11A to 11C.

Figure 11A:
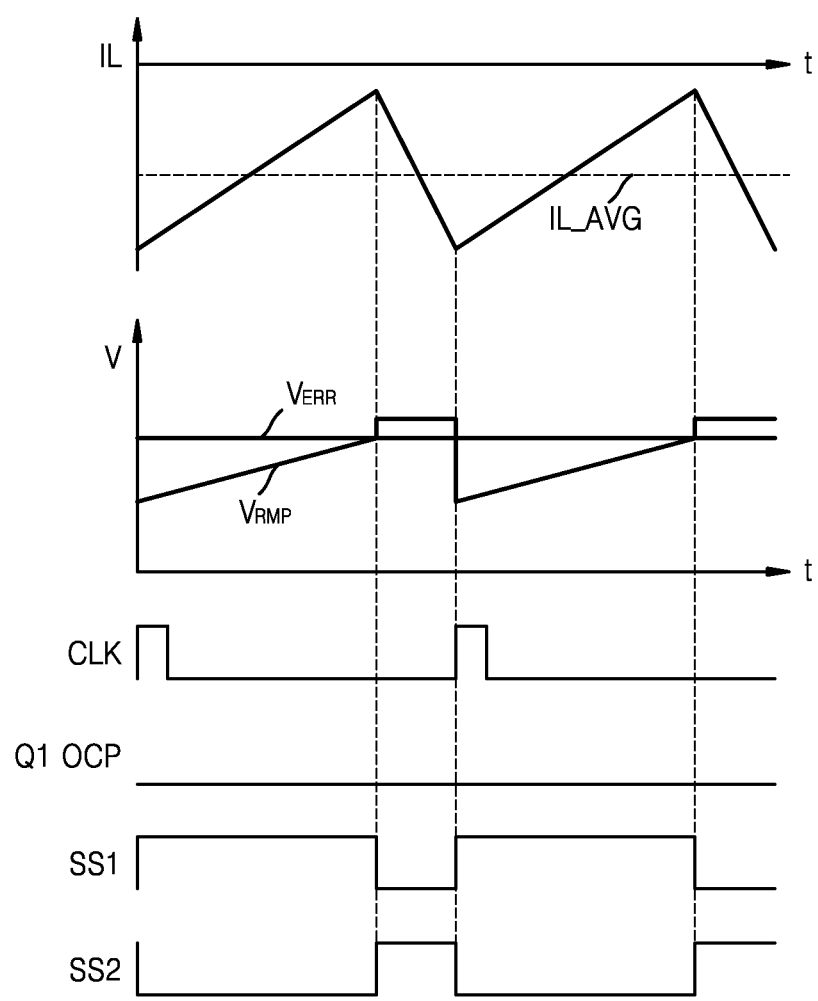
FIGS. 11A, 11B, and 11C are graphs showing signals when a bidirectional switching converter performs a reverse boost converting operation, according to an example embodiment of the inventive concept.
Figure 11B:
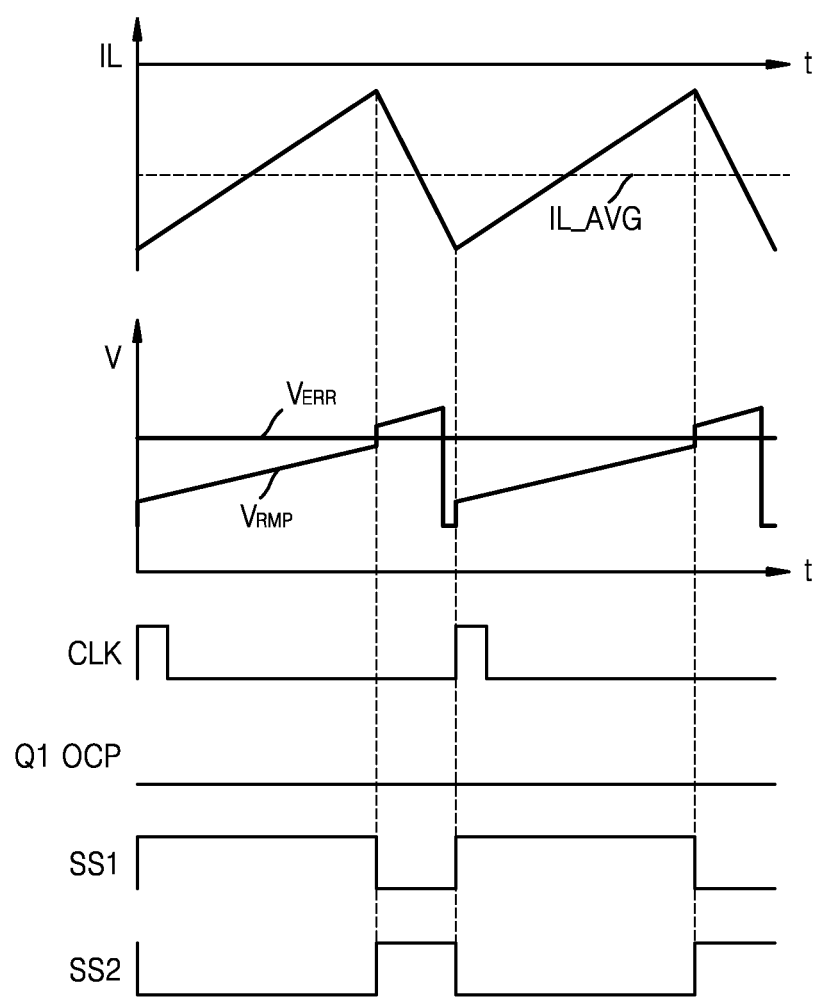
Figure 11C:
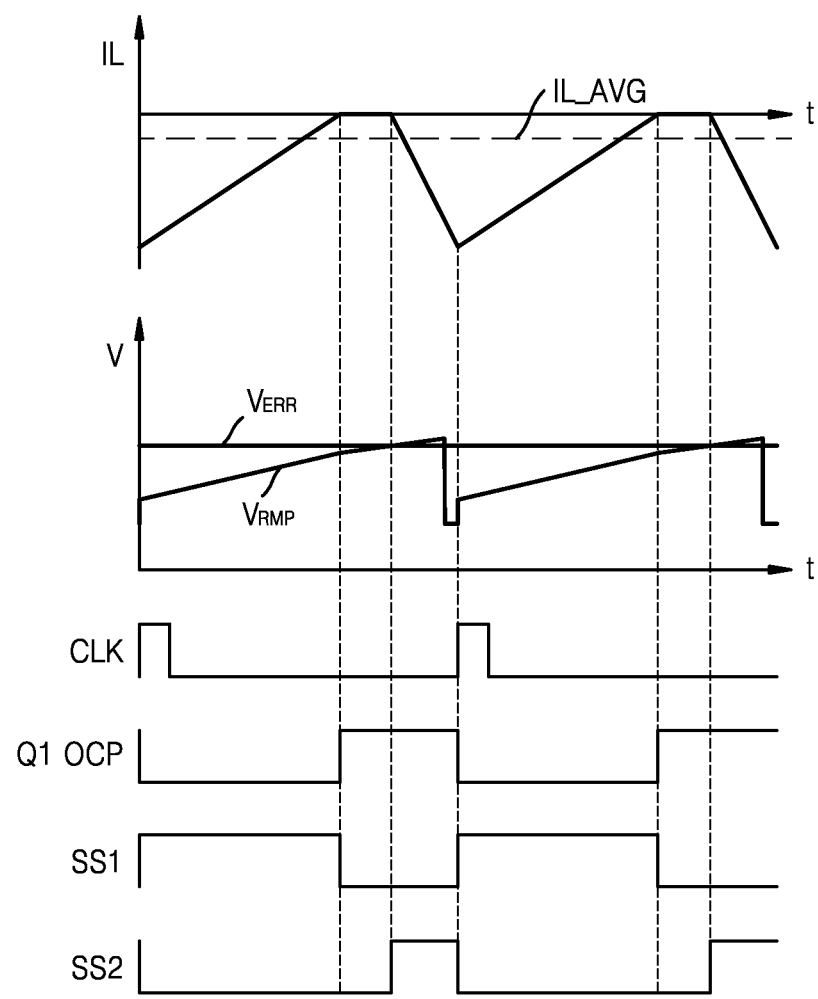

FIGS. 11A, 11B, and 11C are graphs showing signals when a bidirectional switching converter performs a reverse boost converting operation, according to an example embodiment of the inventive concept.

FIGS. 11A, 11B, and 11C show switching operation control of the bidirectional switching converter 110 when the inductor current IL has a negative value, in which FIG. 11A shows switching operation control according to VCMC in a forced continuous conduction section, FIG. 11B shows switching operation control according to PCMC in a continuous conduction section, and FIG. 11C shows switching operation control according to VMC in a discontinuous conduction section.

Referring to FIGS. 11A and 11B, when the ramp voltage $V_{RMP}$ becomes equal to or exceeds the error voltage $V_{ERR}$, the first switching signal SS1 may be switched from the active level to the inactive level and the second switching signal SS2 may be switched from the inactive level to the active level. Therefore, the first switching transistor (Q1 of FIG. 2) may be turned off and the second switching transistor (Q2 of FIG. 2) may be turned on.

Referring to FIG. 11C, when the over-current protection signal OCP is generated as the inductor current IL becomes '0', then the first switching signal SS1 may be switched from the active level to the inactive level and the first switching transistor Q1 may be turned off in response to the first switching signal SS1. In this case, the first switching transistor Q1 is not turned off based on the error voltage $V_{ERR}$ controlled by VCMC, such that control for turning on the second switching transistor Q2 is required.

As shown in FIG. 11C, when the first switching signal SS1 is switched from the active level to the inactive level due to generation of the over-current protection signal OCP, the ramp voltage $V_{RMP}$ may increase without being reset and the second switching signal SS2 may be switched from the low level to the high level at a time when the ramp voltage $V_{RMP}$ reaches the error voltage $V_{ERR}$, such that the second switching transistor Q2 may be turned on. Therefore, the bidirectional switching converter 110 may perform the reverse boosting operation in the reverse boost mode and DCM may be implemented according to VMC when the amount of load current is small (i.e., an absolute value of an average inductor current IL is small). In a DCM section, a switching operation may be controlled at a fixed frequency.

When the bidirectional switching converter 110 operates in the reverse boost mode, the switching operation may be controlled based on the error voltage $V_{ERR}$ according to VCMC in a CCM section and according to VMC in a DCM section, thus implementing a seamless operation.

Figure 12:
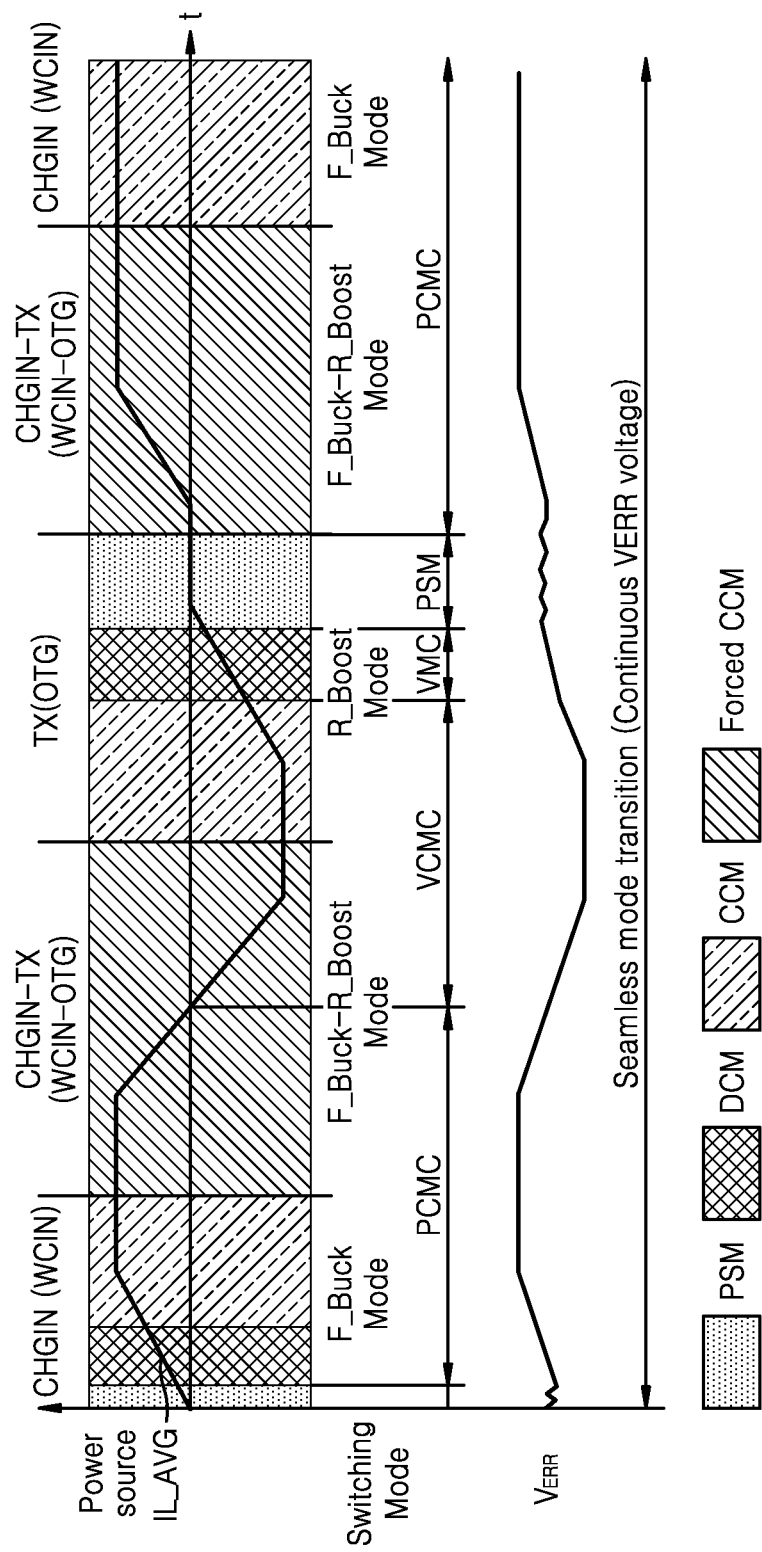
FIG. 12 is a waveform showing transition among a plurality of switching modes of a bidirectional switching converter and error voltages, according to an example embodiment of the inventive concept.

FIG. 12 is a waveform showing transition among a plurality of switching modes of a bidirectional switching converter and error voltages, according to an example embodiment of the inventive concept.

Referring to FIG. 12, when the first input voltage CHGIN or the second input voltage WCIN is applied to the charging IC 100, the bidirectional switching converter 110 may operate in the forward buck mode. When the first input voltage CHGIN is applied to the charging IC 100 and the wireless power transmitting circuit TX is connected to the charging IC 100 or when the second input voltage WCIN is applied and the OTG device OTG is connected to the charging IC 100, the bidirectional switching converter 110 may operate in the forward buck-reverse boost mode. When the wireless power transmitting circuit TX or the OTG device OTG is connected to the charging IC 100, the bidirectional switching converter 110 may operate in the reverse boost mode.

As such, the switching mode of the bidirectional switching converter 110 may be determined according to an input voltage applied to and a wired/wireless device connected to the charging IC 100, and transition between switching modes may be performed according to a change of the input voltage applied to the charging IC 100 and a change of the wired/wireless device connected to the charging IC 100.

In the forward buck (F_Buck) mode and the reverse boost mode, the bidirectional switching converter 110 may operate in a pulse skip mode (PSM), the DCM, and the CCM according to an average inductor current IL_AVG. In a section in which the average inductor current IL_AVG is very small, i.e., the absolute value of the average inductor current IL_AVG is close to '0', the bidirectional switching converter 110 may operate in the PSM. In the PSM, the switching operation may be controlled based on the error voltage $V_{ERR}$, and a variable switching frequency may be used. The bidirectional switching converter 110 may operate in the DCM in a section in which the average inductor current IL_AVG is small (i.e., the inductor current increases or decreases to '0'), and may operate in the CCM in a section in which the average inductor current IL_AVG is large.

In the forward buck-reverse boost (F_Buck-R-Boost) mode, the bidirectional switching converter 110 may operate in a forced CCM such that the inductor current may flow bidirectionally.

The switching operation of the bidirectional switching converter 110 may be controlled according to PCMC in a section in which the average inductor current IL_AVG has a positive value, and the switching operation of the bidirectional switching converter 110 may be controlled according to VCMC in a section in which the average inductor current IL_AVG has a negative value. However, in the forward buck mode and the reverse boost mode, in a section in which the average inductor current IL_AVG is close to 'O', the switching operation may be controlled according to the PSM. When the bidirectional switching converter 110 operates in the DCM in the reverse boost mode, the switching operation may be controlled according to VMC as described above with reference to FIG. 11C.

The switching operation of the bidirectional switching converter 110 is controlled based on the same error voltage VERR in a plurality of switching modes, allowing seamless mode transition between switching modes.

Figure 13:
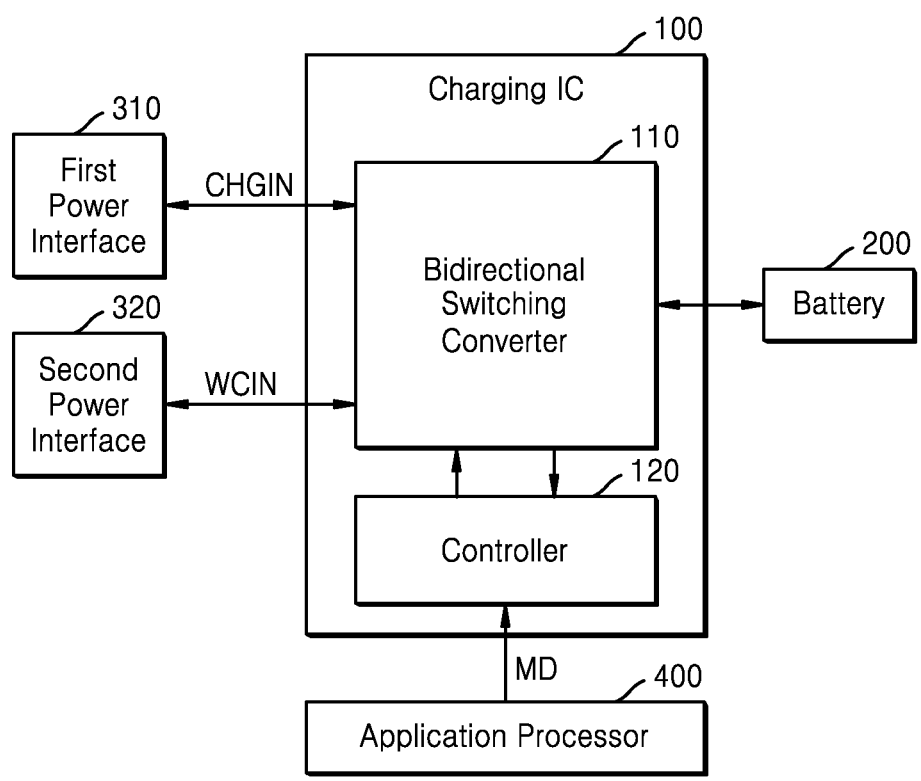
FIG. 13 is a block diagram schematically showing an electronic device including a charging IC, according to an example embodiment of the inventive concept.

FIG. 13 is a block diagram schematically showing an electronic device including a charging integrated circuit, according to an example embodiment of the inventive concept.

Referring to FIG. 13, an electronic circuit 20 includes the charging IC 100, the battery 200, the first power interface 310, the second power interface 320, and an application processor 400. The first power interface 310 may be a wired power interface, and the second power interface 320 may be a wireless power interface. Operations among the charging IC 100, the battery 200, the first power interface 310, and the second power interface 320 are described above with reference to FIG. 1, and thus redundant description thereof are omitted.

In the electronic device 20 of FIG. 13, the application processor 400 may recognize devices connected to the first power interface 310 and the second power interface 320 or voltages provided from the first power interface 310 and the second power interface 320, e.g., the first input voltage CHGIN and the second input voltage WCIN. The application processor 400 may generate a mode signal MD according to a recognized interface device or input voltage and provide the mode signal MD to the controller 120 of the charging IC 100.

For example, when the first input voltage CHGIN is applied through the first power interface 310 and the wireless power transmitting circuit is connected to the second power interface 320, the application processor 400 may recognize the first input voltage CHGIN and the wireless power transmitting circuit and generate the mode signal MD indicating the forward buck-reverse boost mode. When the OTG device is connected to the first power interface 310 or the wireless power transmitting circuit is connected to the second power interface 320, the application processor 400 may generate the mode signal MD indicating the reverse boost mode.

As such, the application processor 400 may generate the mode signal MD indicating a plurality of switching modes and provide the same to the controller 120. The controller 120 may control the bidirectional switching converter 110 to perform a switching operation corresponding to the mode signal MD.

Figure 14:
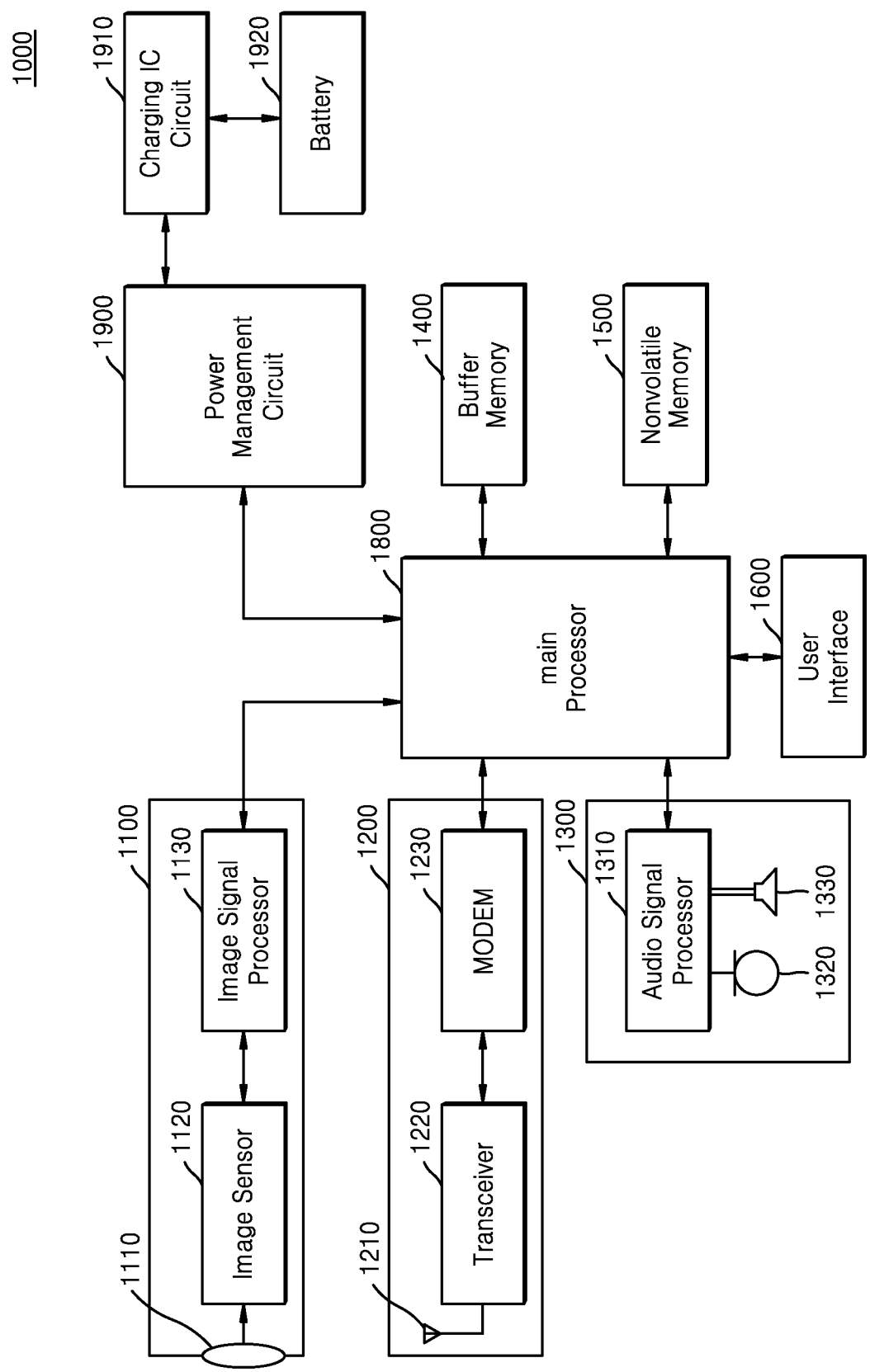
FIG. 14 is a block diagram showing an example configuration of an electronic device including a charging IC, according to an example embodiment of the inventive concept.

FIG. 14 is a block diagram showing an example configuration of an electronic device including a charging IC, according to an example embodiment of the inventive concept.

The electronic device 100 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a main processor 1800, a power management circuit 1900, and a charging IC 1910.

The electronic device 1000 may be connected to a battery 1920 that may supply power used for the operation of the electronic device 1000. However, the inventive concept is not limited thereto, and power supplied to the electronic device 1000 may be provided from an internal/external power source other than the battery 1920.

The image processing block 1100 may receive light through a lens 1110. An image sensor 1120 and an image signal processor 1130 included in the image processing block 1100 may generate image information associated with an external object based on the received light.

The communication block 1200 may exchange signals with an external device/system via an antenna 1210. A transceiver 1220 and a modulator/demodulator (MODEM) 1230 of the communication block 1200 may process the signals exchanged with the external device/system according to one or more of various wired/wireless communication rules.

The audio processing block 1300 may process sound information using an audio signal processor 1310. The audio processing block 1300 may receive audio input through a microphone 1320 and output audio through a speaker 1330.

The buffer memory 1400 may store data used in the operation of the electronic device 1000. For example, the buffer memory 1400 may temporarily store data processed or to be processed by the main processor 1800. For example, the buffer memory 1400 may include a volatile memory such as static random access memory (SRAM), dynamic RAM (DRAM), synchronous DRAM (SDRAM), etc., and/or a nonvolatile memory such as phase-change RAM (PRAM), magneto-resistive RAM (MRAM), resistive RAM (ReRAM), ferro-electric RAM (FRAM), etc.

The nonvolatile memory 1500 may store data regardless of whether power is supplied. For example, the nonvolatile memory 1500 may include at least one of various nonvolatile memories such as flash memory, PRAM, MRAM, RERAM, FRAM, etc. By way of example, the nonvolatile memory 1500 may include a removable memory such as a secure digital (SD) card or a solid state drive (SSD), and/or an embedded memory such as an embedded multimedia card (eMMC).

The user interface 1600 may relay communication between a user and the electronic device 1000. For example, the user interface 1600 may include an input interface for receiving input from the user and an output interface for providing information to the user.

The main processor 1800 may control overall operations of components of the electronic device 1000. The main processor 1800 may process various operations to operate the electronic device 1000. By way of example, the main processor 1800 may be implemented with a general-purpose processor, a special-purpose processor, an application processor, a microprocessor, etc., and may include one or more processor cores.

The power management circuit 1900 may supply power to the components of the electronic device 1000 and manage power. For example, the power management circuit 1900 may output a system voltage based on the power provided from the charging IC 1910 and/or the battery 1920. According to the temperatures, operation modes (e.g., a performance mode, a standby mode, a sleep mode), etc., of the components, the power management circuit 1900 may adjust a frequency of each component, a voltage level of the provided system voltage, etc.

The charging IC 1910 may charge the battery 1920 based on the power provided from the external power source, or provide power to the power management circuit 1900. Alternatively, the charging IC 1910 may provide power to the external device through a wired or wireless power interface based on the power provided from the battery 1920.

The charging IC 100 described with reference to FIGS. 1 to 12 may be applied as the charging IC 1910 to the electronic device 1000. The charging IC 100 may include a bidirectional switching converter. The bidirectional switching converter may operate in the forward buck mode, the forward buck-reverse boost mode, and the reverse boost mode. The switching operation of the bidirectional switching converter is controlled using the same error voltage $V_{ERR}$ and sensing current in each switching mode, allowing seamless mode transition between switching modes.

While the inventive concept has been particularly shown and described with reference to embodiments thereof, it will be understood that various changes in form and details may be made therein without departing from the spirit and scope of the following claims.

What is claimed is:

1. A charging integrated circuit comprising:
   a bidirectional switching converter configured to generate a first output voltage by bucking a first input voltage based on a first switching operation in a buck mode, generate a second output voltage by boosting a second input voltage based on a second switching operation in a boost mode, and generate the first output voltage or the second output voltage based on a third switching operation in a buck-boost mode, where the bidirectional switching converter includes a first transistor connected between a first node and a second node, and a second transistor connected between the second node and a node providing a ground; and
   a controller configured to control the second switching operation in the boost mode by:
   turning off the first transistor when a sensing current based on a bidirectional flow of current between the first and second nodes, is zero in a state where the first transistor is on and the second transistor is off; and
   turning on the second transistor when a ramp voltage based on the sensing current increases to an error voltage.

2. The charging integrated circuit of claim 1, wherein the controller is further configured to generate the error voltage based on a feedback voltage from the bidirectional switching converter and control the first switching operation in the buck mode, the second switching operation in the boost mode, and the third switching operation in the buck-boost mode, based on the error voltage.

3. The charging integrated circuit of claim 1, wherein the bidirectional switching converter comprises:
   an inductor connected between a third node from which the first output voltage is output or to which the second input voltage is applied, and the second node;
   a capacitor connected between the third node and a node providing the ground; and
   a bidirectional current sensor configured to generate the sensing current by sensing a first current flowing in a direction from the first node to the second node and in a direction from the second node to the first node through the first transistor.

4. The charging integrated circuit of claim 3, wherein, when an inductor current flowing from the second node to the third node through the inductor is positive and an absolute value of the inductor current increases, and when the inductor current is negative and the absolute value of the inductor current decreases, the sensing current increases, and when the inductor current is positive and the absolute value decreases and when the inductor current is negative and the absolute value increases, the sensing current is zero.

5. The charging integrated circuit of claim 3, wherein the controller is further configured to compare the ramp voltage generated based on the sensing current with the error voltage generated based on an output voltage of the bidirectional switching converter and generate a pulse width modulation signal for controlling turn-on switching and turn-off switching of the first transistor and the second transistor, based on a result of the comparing.

6. The charging integrated circuit of claim 3, wherein the controller is further configured to:
determine whether an inductor current flowing from the second node to the third node through the inductor is positive or negative, based on a current sensing signal, in the buck-boost mode; and
control the third switching operation according to peak current mode control when the inductor current is positive, and control the third switching operation according to a valley current mode control when the inductor current is negative.

7. The charging integrated circuit of claim 3, wherein the bidirectional switching converter is further configured to:
generate the first output voltage by bucking the first input voltage input to the first node and output the first output voltage through the third node, in the buck mode; and
generate the second output voltage by boosting the second input voltage input to the third node and output the second output voltage through the first node, in the boost mode.

8. The charging integrated circuit of claim 1, wherein the bidirectional switching converter is further configured to:
generate the first output voltage by bucking the first input voltage provided from a first external device and charge a battery based on the first output voltage, in the buck mode and the buck-boost mode; and
generate the second output voltage by boosting the second input voltage provided from the battery and supply power to a second external device based on the second output voltage, in the boost mode and the buck-boost mode.

9. The charging integrated circuit of claim 8, wherein the first external device operates in the buck mode when the first external device is electrically connected to the bidirectional switching converter, the first external device and the second external device operate in the buck-boost mode when the first external device and the second external device are electrically connected to the bidirectional switching converter, and the second external device operates in the boost mode when the second external device is electrically connected to the bidirectional switching converter.

10. An electronic device comprising:
a battery;
a charging integrated circuit configured to charge the battery by bucking a first voltage input through a first node in a buck mode, output a first power through the first node by boosting a second voltage charged in the battery in a boost mode, charge the battery or output the first power in a buck-boost mode;
a first power interface configured to provide the first voltage to the charging integrated circuit; and
a second power interface configured to receive the first power,
wherein the charging integrated circuit comprises:
a direct current (DC)-DC converter including a first transistor connected between the first node and a second node, and a second transistor connected between the second node and a node providing a ground; and
a controller configured to turn off the first transistor when a sensing current based on a bidirectional flow of current between the first and second nodes, is zero in a state where the first transistor is on and the second transistor is off, and turn on the second transistor when a ramp voltage derived from the sensing current increases to an error voltage.

11. The electronic device of claim 10, wherein the first power interface comprises a wired charging circuit, and the second power interface comprises a wireless charging circuit.

12. The electronic device of claim 10, wherein the charging integrated circuit comprises:
the DC-DC converter configured to perform a bucking operation through a first power path in a first direction or a boosting operation through a second power path in a second direction opposite to the first direction, based on a switching operation; and
the controller configured to control the switching operation of a bidirectional switching converter.

13. The electronic device of claim 10, wherein the controller is further configured to generate the error voltage based on a voltage of the first node and control an operation of the DC-DC converter based on the error voltage in the buck mode, the boost mode, and the buck-boost mode.

14. The electronic device of claim 12, wherein the DC-DC converter comprises:
an inductor connected between the second node and a third node;
a first capacitor connected between the first node and a node providing the ground;
a second capacitor connected between the third node and a node providing the ground; and
a current sensor configured to sense a bidirectional current flowing through the first transistor.

15. The electronic device of claim 14, wherein the controller is further configured to seamlessly switch between the buck mode, the boost mode, and the buck-boost mode based on a current sensing signal output from the current sensor.

16. The electronic device of claim 12, wherein the DC-DC converter comprises:
a first switch connected between a first input/output node and the first node and turned on when the first power interface is connected to the first input/output node; and
a fourth transistor connected between a second input/output node and the first node and turned on when the second power interface is connected to the second input/output node.

17. A charging integrated circuit for charging a battery, the charging integrated circuit comprising:
a bidirectional switching converter configured to charge the battery by forming a first power path in a first direction based on a first switching operation in a buck mode, provide power to an external device based on a voltage charged in the battery by forming a second power path in a second direction different from the first direction, based on a second switching operation in a boost mode, and charge the battery or provide the power to the external device based on a third switching operation in a buck-boost mode; and
a controller configured to generate an error voltage indicating a difference between a voltage level of an output voltage and a target voltage level based on an output voltage of the bidirectional switching converter, and control the first switching operation in the buck mode, the second switching operation in the boost mode, and the third switching operation in the buck-boost mode, based on the error voltage.

18. The charging integrated circuit of claim 17,
wherein the bidirectional switching converter includes a first transistor connected between a first node and a second node, and a second transistor connected between the second node and a node providing a ground,
wherein the controller is configured to control the second switching operation in the boost mode by:
  turning off the first transistor when a sensing current based on a bidirectional flow of current between the first and second nodes, is zero in a state where the first transistor is on and the second transistor is off; and
  turning on the second transistor when a ramp voltage based on the sensing current increases to an error voltage.

19. The charging integrated circuit of claim 17, wherein the bidirectional switching converter comprises:
  a first transistor connected between a first node and a second node;
  a second transistor connected between the second node and a node providing a ground;
  an inductor connected between a third node from which an output voltage is output or to which an input voltage is applied, and the second node;
  a first capacitor connected between the first node and a node providing the ground;
  a second capacitor connected between the third node and a node providing the ground; and
  a bidirectional current sensor configured to generate a current sensing signal by sensing a first current flowing bidirectionally through the first transistor.

* * * * *